(12) United States Patent
Uppaluri et al.

(10) Patent No.: US 6,466,687 B1
(45) Date of Patent: Oct. 15, 2002

(54) METHOD AND APPARATUS FOR ANALYZING CT IMAGES TO DETERMINE THE PRESENCE OF PULMONARY TISSUE PATHOLOGY

(75) Inventors: Renuka Uppaluri, Iowa City, IA (US); Theophano Mitsa, Waukesha, WI (US); Eric A. Hoffman, Iowa City, IA (US); Geoffrey McLennan, Iowa City, IA (US); Milan Sonka, Iowa City, IA (US)

(73) Assignee: The University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 09/022,093

(22) Filed: Feb. 11, 1998

Related U.S. Application Data

(60) Provisional application No. 60/037,067, filed on Feb. 12, 1997.

(51) Int. Cl.[7] ............................................. G06K 9/00
(52) U.S. Cl. ...................................... 382/128; 382/131
(58) Field of Search ................................. 382/128, 129, 382/130, 131, 132, 133, 164, 165, 168, 169, 170, 173, 190, 191, 192, 194, 210, 224, 249, 257; 356/456; 345/423

(56) References Cited

U.S. PATENT DOCUMENTS

| | | | | |
|---|---|---|---|---|
| 4,105,922 A | * | 8/1978 | Lambert et al. | 250/495 |
| 4,835,712 A | * | 5/1989 | Drebin et al. | 345/423 |
| 4,839,807 A | | 6/1989 | Doi et al. | |
| 4,851,984 A | | 7/1989 | Doi et al. | |
| 4,922,915 A | | 5/1990 | Arnold et al. | |
| 4,945,478 A | * | 7/1990 | Merickel et al. | 382/131 |
| 4,991,092 A | * | 2/1991 | Greensite | 382/131 |
| 5,054,101 A | * | 10/1991 | Prakash | 382/50 |
| 5,119,436 A | * | 6/1992 | Holdgrafer | 382/146 |
| 5,133,020 A | | 7/1992 | Giger et al. | |

(List continued on next page.)

OTHER PUBLICATIONS

Atam P. Dhawan, Yateen Chitre, Christine Kaiser–Bonasso, and Myron Moskowitz; "Analysis of Mammographic Microcalcifications Using Gray–Level Image Structure Features"; IEEE Catalog# S0278–0062(96)04237–1, pp. 246–259, Jun. 1996.*

A. H. Mir, M. Hanmandlu and S. N. Tandon; "Texture Analysis of CT Images"; IEEE Engineering in Medicine and Biology Catalog#0739–5175/95; pp. 781–786, Nov. 1995.*

(List continued on next page.)

Primary Examiner—Samir Ahmed
(74) Attorney, Agent, or Firm—Fulbright & Jaworski L.L.P.

(57) ABSTRACT

A method and apparatus for analyzing CT images to determine the presence of pulmonary tissue pathology, such as in emphysema, IPF, sarcoid, etc. In accordance with one embodiment, a CT slice is selected to perform an automated, objective, and quantitative analysis of the slice. Initially, an image processing stage is performed, which includes segmentation and edgementation of the selected CT slice for preparation of a series of objective, quantitative measures to be performed on the slice. A region of interest (ROI) is selected on the CT slice in which these objective, quatitative measures are to be taken. The first set of objective, quantitative measures are first order texture measures that describe a frequency of occurrence of all gray levels assigned to pixels within the ROI of the image slice. The second set of objective, quantitative measures are second order texture measures that characterize the spatial interdependencies between particular pixels of the ROI. Fractal analysis could also be performed to provide additional objective, quantitative measures of the ROI. The ROI is classified to a particular tissue pathology class based upon an optimal subset of first or second order texture measures and fractal measures obtained. A color-coded output is displayed for visual presentation to a user indicating the different tissue pathology classes assigned to different regions of the CT slice.

37 Claims, 21 Drawing Sheets

(10 of 21 Drawing Sheet(s) Filed in Color)

U.S. PATENT DOCUMENTS

| | | | |
|---|---|---|---|
| 5,260,871 A | | 11/1993 | Goldberg |
| 5,276,612 A | | 1/1994 | Selker |
| 5,319,549 A | | 6/1994 | Katsuragawa et al. |
| 5,357,110 A | * | 10/1994 | Statham ...................... 250/307 |
| 5,463,548 A | | 10/1995 | Asada et al. |
| 5,491,627 A | | 2/1996 | Zhang et al. |
| 5,513,273 A | | 4/1996 | Ito |
| 5,550,372 A | * | 8/1996 | Yasue ......................... 250/310 |
| 5,598,481 A | | 1/1997 | Nishikawa et al. |
| 5,666,434 A | | 9/1997 | Nishikawa et al. |
| 5,673,332 A | | 9/1997 | Nishikawa et al. |
| 5,754,676 A | * | 5/1998 | Komiya et al. ............. 382/132 |
| 5,784,162 A | * | 7/1998 | Cabib et al. ................ 356/456 |
| 5,872,871 A | * | 2/1999 | Yokoyama et al. ......... 382/173 |
| 5,986,263 A | * | 11/1999 | Hiroi et al. ................. 250/310 |
| 5,991,028 A | * | 11/1999 | Cabib et al. ................ 356/456 |
| 5,991,699 A | * | 11/1999 | Kulkarni et al. ............. 438/10 |
| 6,028,664 A | * | 2/2000 | Cheng et al. ............... 382/149 |
| 6,172,363 B1 | * | 1/2001 | Shinada et al. ............. 250/307 |

OTHER PUBLICATIONS

J. F. Haddon and J. F. Boyce; "Co–occurrence Matrices for Images Analysis"; IEEE Electronics & Communication Eng. Journal, pp. 71–83, Apr. 1993.*

Foster Jr., W. L., P.C. Pratt, V. L. Roggli, J. D. Godwin, R. A.. Halvorsen Jr., and C. E. Putman. 1986. Centrilobular emphysema: CT–pathogenic correlation. *Radiology*, 169:27 32.

Bergin, C. J., N. L. Muller, and R.R. Miller. 1986. CT in the quantitative assessment of emphysema. *J. Thorac. Imaging*, 1:94–103.

Gould, G. A., W. MacNee, A. McLean, P.M. Warren, A. Redpath, J. J. Best D. Lamb, and D.C. Flenley. 1988. CT measurements of lung density in life can quantitate distal airspace enlargement—An essential defining feature of human emphysema. *Am. Rev. Respir. Dis.*, 137:380–392.

Muller, N. L., C.A. Staples, R.R. Miller and R. T. Abboud. 1988. Density mask: An objective method to quantitate emphysema using computer tomography. *Chest*, 94:782–787.

Kuwano, K., K. Matsuba, T. Ikeda, J. Murakami, A. Araki, H. Nishitani, T. Ishida, K. Yasumoto, and N. Shigematsu 1990. The diagnosis of mild emphysema—Correlation of computed tomography and pathology scores. *Am. Rev. Respir. Dis.*, 141:169–178.

Sakai, N., M. Mishima, K. Nishimura, H. Itoh, and K. Kuno. 1994. An automated method to assess the distribution of low attenuation areas on chest CT scans in chronic pulmonary emphysema patients. *Chest*, 106:1319–1325.

Kinsella, M., N. L. Muller, R. T. Abboud, N. J. Morrison, and A. DyBuncio. 1990. Quantitation of emphysema by computed tomography using a 'density mask' program and correlation with pulmonary function tests. *Chest*, 97:315–321.

Archer, D. C., C. L. Coblentz, R. A. deKemp, C. Nahmias, and G. Norman. 1993. Automated in vivo quantification of emphysema. *Radiology*, 188:835–838.

Knudson, R. J., J. R. Standen, W. T. Kaltenborn, D.E. Knudson, K. Rehm, M. P. Habib, and J. D. Newell. 1991. Expiratory computed tomography for assessment of suspected pulmonary emphysema. *Chest*, 99:1357–1366.

Haralick, R. M. 1979. Statistical and structural approaches to texture. *Proceedings IEEE*, 67(5): 786–804.

Ferdeghini, E. M., B. Pinamonti, E. Picano, F. Lattanzi, R. Bussani, G. Slavich, A. Benassi, F. Camerini, L. Landini, and A. L'Abbate. 1991. Quantitative texture analysis in echocardiography: Application to the diagnosis of myocarditis. *J. Clin. Ultrasound*. 19:263–270.

Fleagle, S. R., W. Stanford, T. L. Burns, and D. J. Skorton. 1994. Feasibility of quantitative texture analysis of cardiac magnetic resonance imagery: Preliminary results. In Medical Imaging 1994: Physiology and Function from Multidimensional Images, vol. 2168, SPIE, Bellingham, Wa. 23–32.

Cornelis, J., J. De Becker, M. Bister, C. Vanhove, G. Demonceau, and A. Cornelis. 1992. Techniques for cardiac image segmentation. In Proceedings of the 14th IEEE EMBS Conference, vol. 14, IEEE, Piscataway, NJ. 1906–1908.

Pentland, A. P. 1984. Fractal–based description of natural scenes. *IEEE Trans. Pattern Anal. and Machine Intelligence*, PAMI–6(6):661–675.

Chen, C., J. S. Daponte, and M. D. Fox. 1989. Fractal feature analysis and classification in medical imaging. *IEEE Trans. Med. Imaging*, 8(2): 133–142.

Wu, C. M., Y. C. Chen, and K. S. Hsieh. 1992. Texture features for classification of ultrasonic liver images. *IEEE Trans. Med. Imaging*. 11(2): 141–152.

Lundahl, T., W. J. Ohley, W. S. Kuklinski, D. O. Williams, H. Gewirtz, and A. S. Most. 1985. Analysis and interpretation of angiographic images by use of fractals. *InIEEE Proc. Computers in Cardiology*, IEEE, Los Alamitos, CA. 355–358.

Hayhurst, M. D., W. MacNee, D.C. Flenley, D. Wright, A. McLean, D. Lamb, A. J. A. Wightman, and J. Best. 1984. Diagnosis of pulmonary emphysema by computer tomography *Lancet*, 2:320–322.

Kruger, R. P., W. B. Thompson, and A. F. Turner. 1974. Computer diagnosis of pneumoconiosis. *IEEE Trans. Systems. Man and Cybernetics*, SMC–4–(1):40–49.

American Thoracic Society, Future directions for research on diseases of the lung—*Am. Rev. Respir. Dis.*, 152:1713–1735, 1995.

A. V. Neale and R. Y. Demers, Significance of the inability to reproduce pulmonary function test results. *JOM*, 36(6):660–666, 1994.

G. Hartley, J. R. Galvin, G. W. Hunninghake, J. A. Merchant, S. J. Yagla, S. B. Speakman, D. A. Schwartz. High–resolution CT–derived measures of lung density are valid indexes of interstitial lung disease. *J. Appl. Physiol*, 76(1):271–277, 1994.

C. Sanders, Imaging of emphysema. *Seminars in respiratory medicine*. 13(4):318–331, 1992.

C. J. Bergin, N. L. Muller, D. M. Nichols, G. Lillington, J. C. Hogg, B. Mullen, M. R. Grymaloski, S. Osborne, and P. D. Page. The diagnosis of emphysema. A computed tomographic—pathologic correlation. *Am. Rev. Respir. Dis.*, 133:541–548, 1986.

R. A. Lerski, K. Straughan, L. R. Schad, D. Boyce, S. Biumi, and I. Zuna. MR image texture analysis—An approach to tissue characterization. *Magnetic Resonance Imaging*, 11:873–887, 1993.

R. W. Conners and C. A. Harlow. A theoretical comparison of texture algorithms, *IEEE Trans. Pattern Anal and Machine Intelligence*, 2(3):204–222, 1980.

E. B. Cargill, K. Donohoe, G. Kolodny, J. A. Parker, and R. E. Zimmerman. Analysis of lung scans using fractals. In *Proc. SPIE Medical Imaging III*, vol. 1092, Newport Beach, CA, pp. 2–9, Bellingham, Wa, 1989, SPIE.

C. B. Caldwell, S. J. Stapleton, D. W. Holdsworth, R. A. Jong, W. J. Weiser, G. Cooke, and M. J. Yaffe, Characterization of mammographic parenchymal pattern by fractal dimension. *Phys. Med. Biol.*, 35(2):235–247, 1990.

P.E. Grant and C. J. Lumsden. Fractal analysis of renal cortical perfusion. *Invest. Radial*, 29(1):16–23, 1994.

R. Jagoe, C. Sowter, and G. Slavin. Shape and texture analysis of liver cell nuclei in hepatomas by computer aided microscopy. *J. Clin. Pathol.*, 37:755–762, 1984.

D. M. Tucker, J. Correa, M. Souto, and K. S. Malgari. A study of fractal dimension in chest images using normal and interstitial lung disease cases. In *Medical Imaging 1995: Physiology and Function from Multidimensional Images*, vol. 2433, San Diego, Ca, pp. 133–142, Bellingham, Wa, 1995, SPIE.

L. J. Rosenblum, R. A. Mauceri, D. E. Wellenstein, F. D. Thomas, D. A. Bassano, B. N. Raasch, C. C. Chamberlain, and E. R. Heitzman. Density patterns in the normal lung as determined by computed tomography. *Radiology*, 137:409–416, 1980.

R. N. Sutton and E. L. Hall, Texture measures for automatic classification of pulmonary disease. *IEEE Trans. Computers*, c–21(7):667–676, 1972.

R. J. Tully, R. W. Conners, C. A. Harlow, and G. S. Lodwick. Towards computer analysis of pulmonary infiltration. *Radiology*, 13:298–305, 1978.

R. S. Ledley, H. K. Huang, and L. S. Rotolo. A texture analysis method in classification of coal worker's pneumoconiosis. *Comput. Biol. Med.*, 5:53–67, 1975.

A. F. Turner, R. P. Kruger, and W. B. Thompson, Automated computer screening of chest radiographs for pneumoconiosis, *Invest. Radiol.*, 11:258–266, 1976.

S. Katsuragawa, K. Doi, N. Nakamori, and H. MacMahon. Image feature analysis and computer–aided diagnosis in digital radiography: Effect of digital parameters on the accuracy of computerized analysis of interstitial disease in digital chest radiographs. *Med. Phys.*, 17(1):72–78, 1990.

J. Kittler and J. Foglein. Contextual classification of multispectral pixeldata. *Image and Vision Computing*, 2(1):13–29, 1984.

J. Kittler and J. Foglein. Contextual decision rules for objects in lattice configuration. In *Proceedings of 7th International Conference on Pattern Recognition*. Montreal, Canada, pp. 270–272. IEEE, 1984.

R. M. Haralick, K. Shanmugam. I. Dinstein, Textural Features for Image Classification, IEEE *Transactions on Systems, Man and Cybernetics*, vol. SMC–3, No. 6, 1973.

M. Bister, Computer Analysis of Cardiac MR Images, Excerpts from the PHD Thesis.

* cited by examiner

1 ---$a_1$---$a_2$---$a_3$---$a_4$---$a_5$-
2 ---$b_1$---$b_2$---$b_3$---$b_4$---$b_5$-
3 ---$c_1$---$c_2$---$c_3$---$c_4$---$c_5$-
4 ---$d_1$---$d_2$---$d_3$---$d_4$---$d_5$-
5 ---$e_1$---$e_2$---$e_3$---$e_4$---$e_5$-
FIG. 5A
$a_1$ $a_2$ $a_3$ $a_4$ $a_5$-
$b_1$ $b_2$ $b_3$ $b_4$ $b_5$-
$c_1$ $c_2$ $c_3$ $c_4$ $c_5$-
$d_1$ $d_2$ $d_3$ $d_4$ $d_5$-
$e_1$ $e_2$ $e_3$ $e_4$ $e_5$-
1   2   3   4   5
FIG. 5B
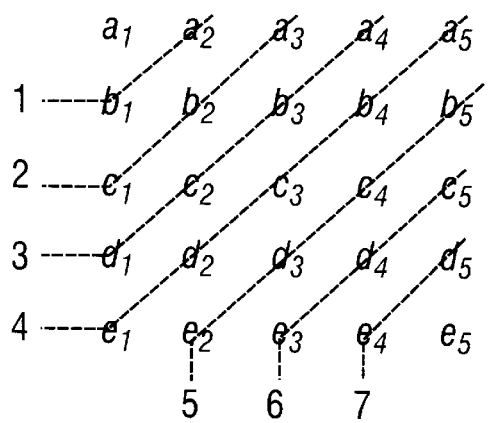
FIG. 5C
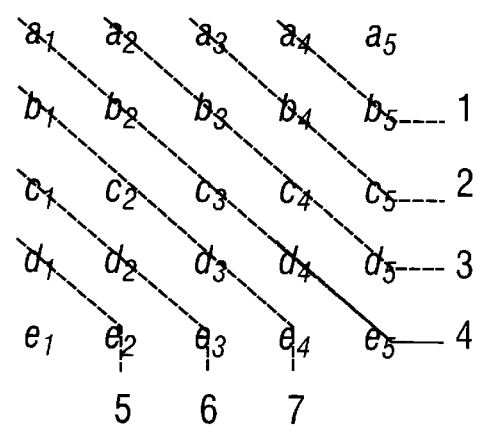
FIG. 5D

|       |       |       |       |       |       |       |
|-------|-------|-------|-------|-------|-------|-------|
| $a_1$ | $a_2$ | $a_3$ | $a_4$ | $a_5$ | $a_6$ | $a_7$ |
| $b_1$ | $b_2$ | $b_3$ | $b_4$ | $b_5$ | $b_6$ | $b_7$ |
| $c_1$ | $c_2$ | $c_3$ | $c_4$ | $c_5$ | $c_6$ | $c_7$ |
| $d_1$ | $d_2$ | $d_3$ | $d_4$ | $d_5$ | $d_6$ | $d_7$ |
| $e_1$ | $e_2$ | $e_3$ | $e_4$ | $e_5$ | $e_6$ | $e_7$ |
| $f_1$ | $f_2$ | $f_3$ | $f_4$ | $f_5$ | $f_6$ | $f_7$ |
| $g_1$ | $g_2$ | $g_3$ | $g_4$ | $g_5$ | $g_6$ | $g_7$ |

In FIG. 9A, the dashed box 910 encloses columns 2–6, rows b–f; the current pixel $d_4$ is highlighted.

FIG. 9A

In FIG. 9B, the dashed box 910 encloses columns 3–7, rows b–f; the current pixel $d_5$ is highlighted.

METHOD AND APPARATUS FOR ANALYZING CT IMAGES TO DETERMINE THE PRESENCE OF PULMONARY TISSUE PATHOLOGY

PRIORITY CLAIM

This application claims priority of U.S. Provisional Application No. 60/037,067, filed Feb. 12, 1997, entitled: "Method and Apparatus for Analyzing CT Images to Determine the Presence of Pulmonary Parenchyma", by Renuka Uppaluri, Theophano Mitsa, Eric A. Hoffman, Geoffrey McLennan, and Milan Sonka.

BACKGROUND OF THE INVENTION

1. Field of the Invention

The present invention relates generally to the detection and diagnosis of tissue pathology using a diagnostic medical image, and, more particularly, to a method and apparatus for detecting and diagnosing the presence of pulmonary tissue pathology from CT images using an automated texture analysis procedure.

2. Description of the Related Art

Pulmonary emphysema is a common, debilitating, and progressive disorder of the lungs that may result from smoking. The disorder is caused by destruction of the alveolar walls of the lung parenchyma (i.e., lung tissue), which results in an abnormal enlargement of air spaces distal to the terminal bronchiole. Enlargement of these air spaces in the lungs impedes the exchange of oxygen in the air for carbon dioxide in the bloodstream. As a result of this impeded process, an individual experiences breathlessness, making ordinary tasks, once thought simple, labor intensive.

While emphysema causes tissue in the lungs to atrophy, other pulmonary diseases, such as idiopathic pulmonary fibrosis (IPF) and sarcoidosis (sarcoid), cause the build-up of tissue in the lungs. Albeit the effects of emphysema and IPF and sarcoid might seem to be directly opposite from one another, IPF and sarcoid also suffer the same negative symptom of chronic fatigue. That is, IPF and sarcoid also impede the carriage of oxygen from the lungs to the bloodstream like emphysema.

In addition to those pulmonary parenchymal diseases discussed above, peripheral small airways diseases, such as cystic fibrosis and asthma (along with over one-hundred other pathologies) also exist, which can adversely affect the lungs of an individual as well.

The debilitating effects of these pulmonary diseases are progressive and often permanent. Therefore, accurate diagnosis of these disorders at their earliest stage is extremely critical so that measures can be taken to thwart their advancement before significant damage occurs.

Pulmonary function tests have been conventionally used to indicate the presence of pulmonary diseases. However, these tests are not always able to properly distinguish between the abnormalities of the lung that result from one particular disorder from another.

Chest radiographs (i.e., X-ray projections) have also been used for diagnosing pulmonary diseases. However, because of problems resulting from structural superposition associated with projection images and inter and intra-observer variability in analysis, visual examination of these X-ray derived images are moderately reliable when a particular disease is well developed, and are effectively unreliable for identifying mild to moderate stages of the disease. Furthermore, external factors such as film speed, X-ray beam voltage, anode heel effect, and variations in chest wall thickness may adversely impact the radiographic density of the X-ray. Thus, the diagnosis of pulmonary disorders based upon radiographic density has proven to be unreliable as a result of these external factors.

X-ray computed tomography (CT), using X-ray energy, has proven to be more sensitive in demonstrating lung pathology, and, thus, more reliable than chest X-ray projection imaging in detecting pathological changes in lung tissue that are indicative of pulmonary diseases. CT's greatest contribution is its ability to provide a view of the anatomy without interference from overlying and underlying structures within the body cavity. Tomographic imaging (from multiple energy sources) are proving to provide complimentary information. Although X-ray CT is currently the preferred imaging method for evaluating the lung, use of high concentration oxygen and hyperpolarized gases, such as helium and xenon, have made it possible to begin thinking about nuclear magnetic resonance imaging for use in the assessment of lung parenchymal and peripheral pathology.

While X-ray computed tomography provides advancement over the chest radiograph in visually depicting the characteristics of pulmonary diseases, diagnosis of these diseases has remained dependent upon the subjectivity of the trained observer (e.g., radiologist) who reads the CT image. The trained observers' visual perception of different textures present on the CT images can be highly subjective, and thus, variations in accuracy is common between the trained observers. Furthermore, visual assessments provide limited sensitivity to small textural changes on the CT image. Thus, an early case of the pulmonary disorders may go undetected due to the physical limitations of the human eye, and the capacity of the brain to interpret the data. This would pose a serious disadvantage to the welfare of the patient, especially since the debilitating effects of these pulmonary diseases are often irreversible.

The present invention is directed to overcoming, or at least reducing the effects of, one or more of the problems set forth above.

SUMMARY OF THE INVENTION

In one aspect of the present invention, a method is provided for the automated analysis of textural differences present on a diagnostic medical image. The image comprises a plurality of pixels, with each pixel having a particular gray level assigned thereto. The method includes defining a region of interest (ROI) on the image; performing one or more first order texture measures within the ROI to describe a frequency of occurrence of all gray levels assigned to pixels of the ROI; performing one or more second order texture measures within the ROI to describe spatial interdependencies between particular pixels of the ROI; and classifying the ROI as belonging to a particular tissue pathology class based upon the first and second order texture measures obtained.

In another aspect of the present invention, an apparatus is provided for analyzing diagnostic medical images. The apparatus comprises an image input, which is adapted to receive a diagnostic medical image. The diagnostic medical image includes a plurality of pixels, with each pixel having a particular gray level assigned thereto. The apparatus further comprises a processor adapted to perform texture measures on a group of pixels within the image. The texture measures describe information on an occurrence frequency of gray levels assigned to a group of pixels and spatial interdependencies between particular pixels of the group of pixels. The processor is further adapted to classify the group of pixels to a particular tissue pathology class based upon the texture measures obtained.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

Other objects and advantages of the invention will become apparent upon reading the following detailed description and upon reference to the drawings in which:

FIGS. 5A–5D illustrate a sample ROI having pixels $a_x$ through $e_x$;

FIGS. 9A and 9B show a sample ROI for illustrating the calculation of the SFD of FIG. 8;

FIGS. 14–22 are scanned images which depict a graphical user interface (GUI) displayed on a display of FIG. 13.

Figure 1:
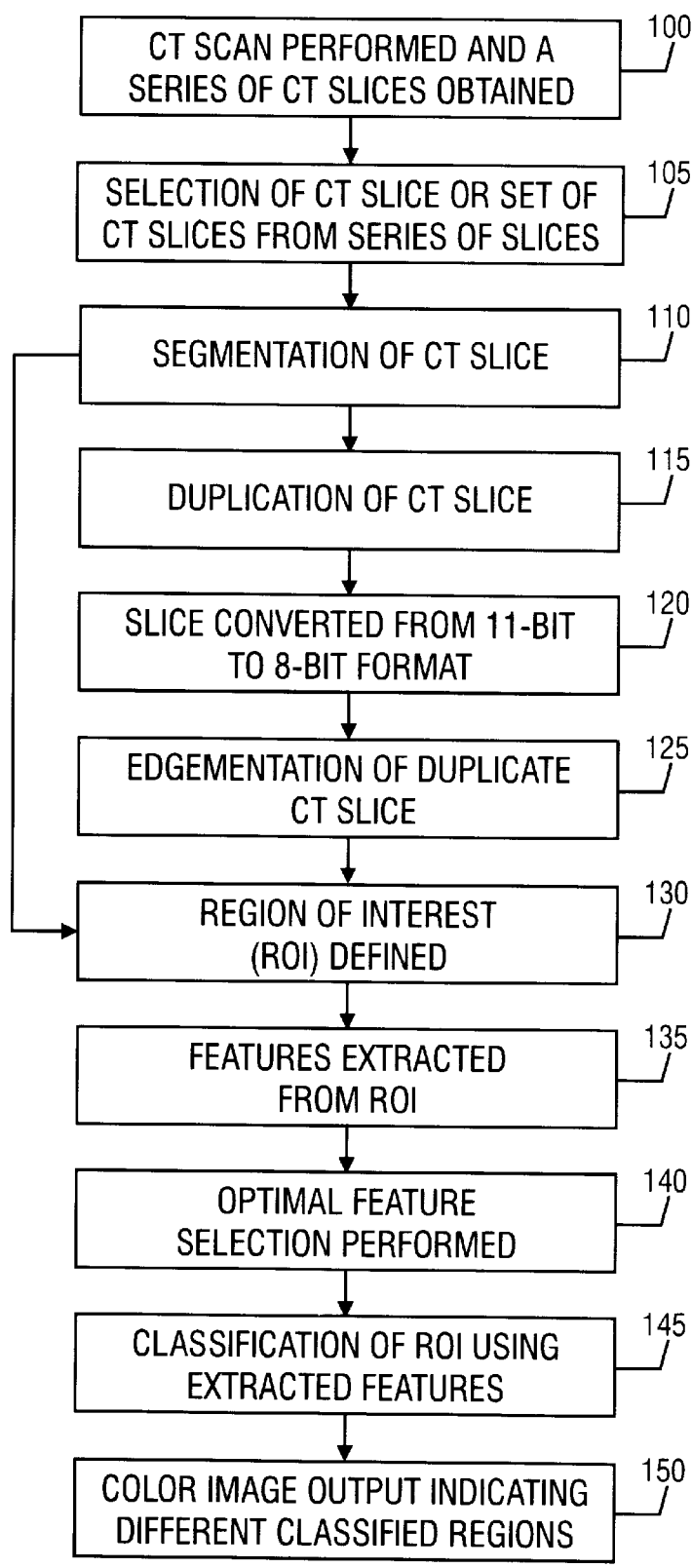
FIG. 1 shows a flowchart depicting the process used to perform an objective analysis of a diagnostic medical image in accordance with one embodiment of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims

DESCRIPTION OF THE PREFERRED EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nonetheless be a routine undertaking for those of ordinary skill in the art having the benefit of this disclosure.

Turning now to the drawings and specifically referring to FIG. 1, a flowchart is shown illustrating the process used to perform an objective analysis of a diagnostic medical image, which in one embodiment is a computed tomography (CT) image. The process commences at step 100 where a scan is performed on a suspect diseased area of the body, such as the lung parenchyma (i.e., lung tissue) in accordance with one embodiment. This is accomplished with any CT scanner, such as the Imatron Fastrac C-150 ultrafast scanner. The scan produces a series of two-dimensional 11-bit slices (i.e., cross-sectional images), each having 512×512 pixels with 2,048 varying gray levels. These varying gray levels represent the lung parenchyma's texture in a particular cross-sectional layer of the lung field. When all of these slices are "stacked" upon one another, a three-dimensional image is produced describing the lung field in its entirety. At step 105, a two-dimensional slice is selected from the series of CT slices for analysis. Or, alternatively, a set of CT slices (i.e., a plurality of CT slices) could also be selected for simultaneous analysis, if so desired.

Figure 2A:
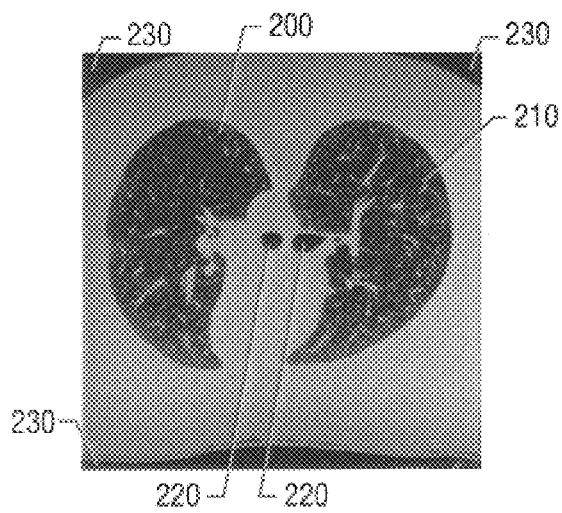
FIGS. 2A and 2B are scanned images showing a CT slice of left and right cross sections of the lungs before and after, respectively, a segmentation process.
Figure 2B:
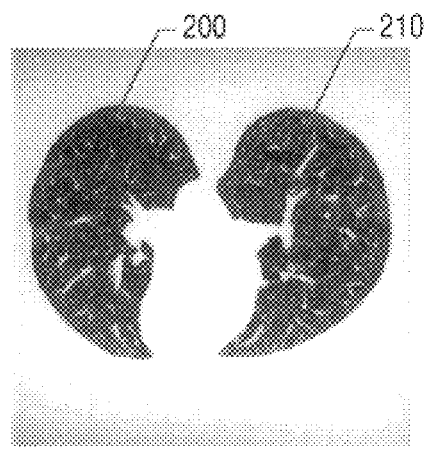

To prepare the CT slice for the objective analysis procedure, an image processing stage commences at step 110 where segmentation of the slice occurs. Referring to FIG. 2A, a slice of left and right cross-sections of the lungs, designated by 200 and 210, respectively, is shown along with other structures, such as the trachea 220 and tissue 230 surrounding the left and right cross-sections of the lung. Since only the lung parenchyma is examined in the illustrated embodiment, the trachea 220 and tissue 230 are not material (i.e., not essential) to such examination. Accordingly, the process of segmentation is used to remove all "non-essential" structures from the CT slice to alleviate its complexity, thus permitting sole evaluation of the lung parenchyma itself. As depicted in FIG. 2B, the left and right cross-sections of the lung 200 and 210, respectively, solely remain as a result of the removal of the trachea 220 and the tissue 230 subsequent to the segmentation process. Segmentation of the CT slice can be performed either manually or automatically using existing methods well known to those skilled in the art. For example, one segmentation technique permits the user to manually remove the "non-essential" structures by utilizing commercially available software and a computer mouse to "outline" the desired regions of the lung parenchyma within the image slice. The user then subsequently assigns all of the pixels within the undesired regions a gray level that is equivalent to the background gray level of the image slice, thus causing the undesired structures to "disappear" from the slice. A more detailed description of this particular segmentation technique is fully disclosed in "VIDA: An Environment for Multidimensional Image Display and Analysis", by E. A. Hoffman et al., Proc. SPIE Biomed Image Processing and 3-D Microscopy, Vol. 1660, pp. 694–711, 1992, the entire contents of which is incorporated herein by reference.

Subsequent to the segmentation process, it is advantageous to take some objective measures of the scanned parenchyma, such as first order texture and fractal measures (described later), utilizing the 11-bit segmented slice. Other objective measures, such as second order texture measures (also described later), are optimally obtained after additional image processing of the segmented slice. Therefore, the segmented slice is duplicated at step 115 such that the original segmented slice is used to take the first order texture and fractal measures, while the duplicate segmented slice is processed further in preparation for taking the second order texture measures.

To enhance the results of the second order texture measures, the duplicate segmented slice is converted, at step 120, from an 11-bit format containing 2,048 gray levels to an 8-bit format with 256 gray levels. Following this conversion, the process of edgementation occurs on the 8-bit duplicate segmented slice at step 125.

Edgementation is an algorithm used for defining regions within the CT slice, where the actual gray levels of the pixels within the defined regions are substantially similar. That is, the process assigns an "average" gray level to those adjacent (or neighboring) pixels of the image slice that differ in gray level by an insignificant amount. As a result, regions are defined by pixels that are assigned the same gray level.

The edgementation technique is employed for the purpose of defining the primitives within the image slice. Since emphysematous tissue is characteristic of large dark holes in the parenchyma, the edgementation technique creates large primitives with low gray levels in the emphysematous regions of the image slice, whereas normal regions give rise to smaller or larger primitives with presumably higher gray levels.

Figure 3:
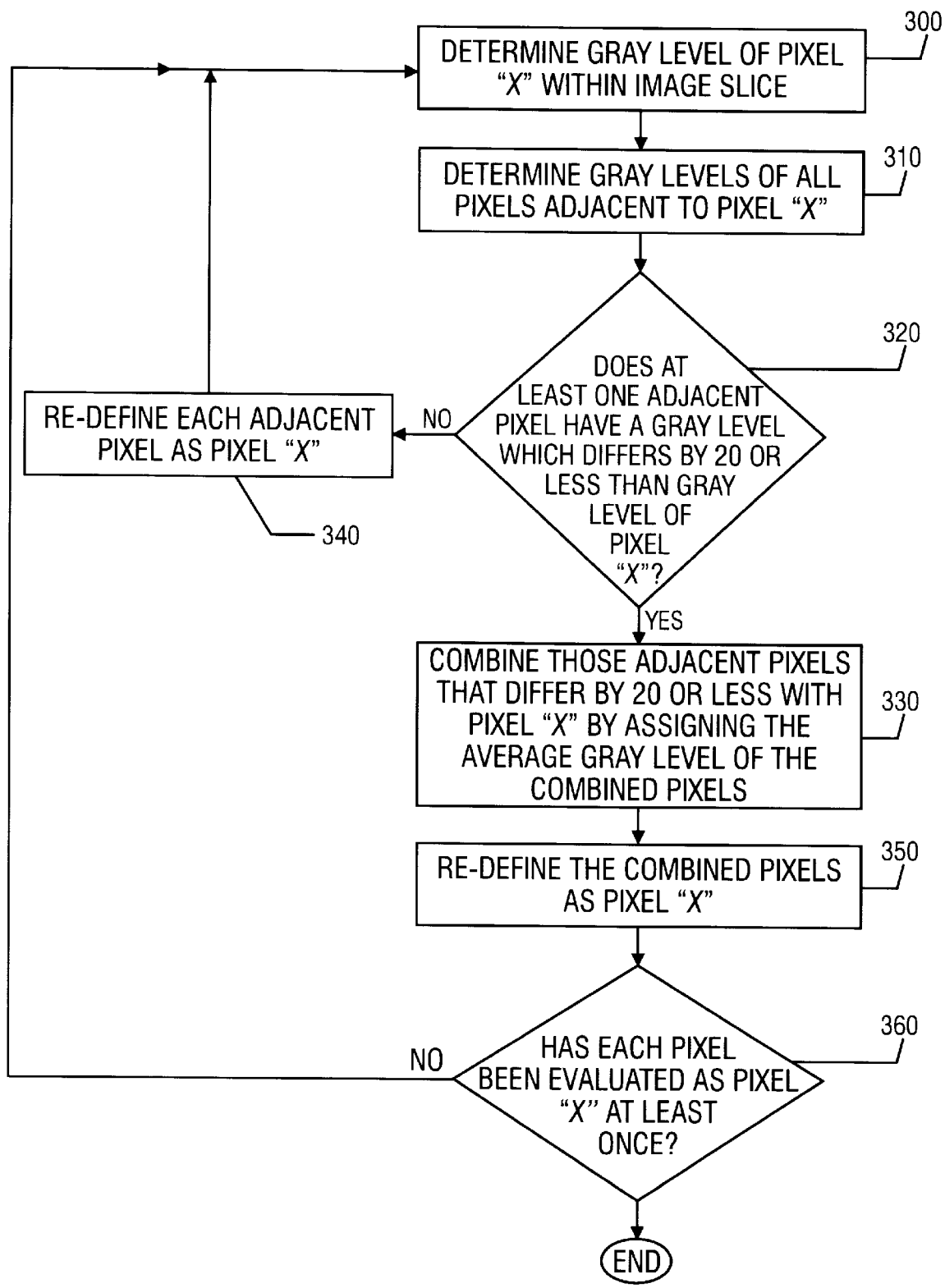
FIG. 3 depicts a process used to perform edgementation on an 8-bit CT slice.

Referring to FIG. 3, the edgementation process commences at step 300 by determining the gray level of a particular pixel "x" within the image slice. Subsequently, at step 310, the gray levels of all pixels adjacent to (i.e., neighboring) pixel x are also determined. At step 320, it is determined if at least one adjacent pixel has a gray level that differs by a negligible amount to the gray level of pixel x, which in the illustrated embodiment is a value of 20. If none of the adjacent pixels' respective gray levels differ by 20 or less from the gray level of pixel x, then each of the adjacent pixels is redefined as pixel x (at step 340) and the process starts again at step 300 for each of those pixels. On the other hand, if at least one of the adjacent pixel's gray level differs by an insignificant amount, at step 330 the adjacent pixels (which differ by 20 or less) and pixel x are "combined" by assigning a gray level that is the average of the actual gray levels of the combined pixels. The process then continues from step 330 to step 350 where the "combined" pixels as a whole are redefined as pixel x. Subsequently, at step 360, it is determined whether or not each pixel of the image slice has been evaluated as pixel x at least once. If each pixel has been evaluated as pixel x at step 360, then the process returns to step 300; otherwise, the process ends where edgementation of the entire CT slice is complete.

Figure 4A:
FIGS. 4A and 4B are scanned images depicting a segmented CT slice of a lung parenchyma before and after, respectively, edgementation.
Figure 4B:
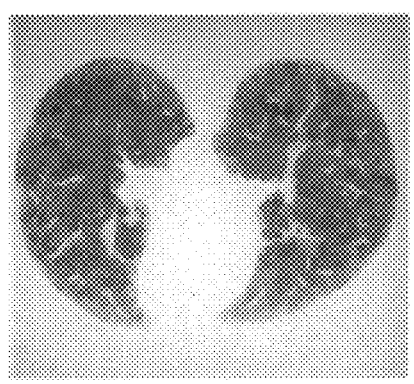

As a result of the edgmentation technique, regions (defined by combined pixels) are created on the edgemented slice where the gray levels of those pixels within the region differ by an insignificant amount. FIG. 4A illustrates a segmented CT slice of a lung parenchyma before edgementation and FIG. 4B shows the same segmented CT slice with the newly created regions subsequent to the edgementation technique described above.

It should be noted that the "combining" of pixels is done in a visual sense by assigning the same gray level to the adjacent pixels (provided that these adjacent pixels differ in actual gray level by a negligible amount to that of pixel x). Thus, the adjacent pixels that are assigned the same gray level will appear to have been combined visually with pixel x, and hence, a small region on the image is formed.

A further description of the edgmentation process can be found in "Computer Analysis of Cardiac MR Images", by M. Blister, ETRO/IRISVUB, Vrije Universeit Brussel, Brussels, Belguim, 1990, the entire contents of which is incorporated herein by reference.

Returning to FIG. 1, after image processing is complete with the original 11-bit segmented slice and the 8-bit edgemented duplicate slice, a region of interest (ROI) is defined at step 130. The ROI is defined on both the original 11-bit segmented slice and the 8-bit edgemented duplicate slice for the calculation of the objective texture measures. The ROI is a "window" of pixels (i.e., a pixel block) wherein the objective texture measures (i.e., first order, fractal, and second order) are calculated on the image slice. In one embodiment, the size of the ROI window is 31×31 pixels with an overlapping region of 15×15 pixels, i.e., the window "skips" across the original segmented and edgemented duplicate slices at 15 pixel intervals. Although in the illustrated embodiment a 31×31 ROI window is used, other window sizes can also be used depending on which size would be best suited for a particular diagnostic study of the image slice. For example, an ROI of 19×19 pixels overlapping with a region of 9×9 may be more appropriate for a particular study than the 31×31 ROI.

At step 135, the features of the region of interest on both the original 11-bit segmented slice and the 8-bit edgemented duplicate slice are "extracted" (i.e., determined) by taking various measurements (e.g., first order, second order, and fractal measures). These measurements provide a quantitative, and thus objective, assessment of the region of interest and are described in detail hereinbelow.

Multiple Feature Extraction

First Order Texture Measures

The first order texture measures are determined from the region of interest (ROI) of the original 11-bit segmented CT slice having 2,048 gray levels. To calculate these first order texture measures, a gray level distribution (i.e., a histogram) is created to display the occurrence frequencies of all the gray levels in the ROI. In other words, the histogram is a plot that visually indicates the total number of pixels in the ROI that possess a particular gray level.

There are two types of first order texture measures that provide an objective assessment of the gray level histogram of the image slice. One of these types is the gray level distribution measures that describe the overall lightness/darkness of the image as well as its shape, asymmetry, and peakedness. Specifically, these gray level distribution measures are the Mean, Variance, Skewness, Kurtosis, and Gray Level Entropy and are obtained from the formulae provided below.

I. Gray Level Distribution Measures (a) Mean Gray Level (MEAN)—provides a measurement of the overall lightness/darkness of the image.

$$g_{ave} = (1/N) * \sum_{(i,j) \in R} g(i,j) \tag{1}$$

where:
g(i,j) is the gray level at pixel location (i,j) of the image
R is the matrix of the ROI
N is the total number of pixels (b) Variance of Gray Levels (VAR)—characterizes the shape of the gray level histogram. The standard deviation, which describes the overall contrast of the image, can be calculated from the variance.

$$V_g = (1/N) * \sum_{(i,j) \in R} [g(i,j) - g_{ave}]^2 \quad (2)$$

(c) Skewness (SKEW)—quantitatively evaluates the asymmetry of the gray level histogram's shape.

$$s = \frac{(1/N) * \sum_{(i,j) \in R} [g(i,j) - g_{ave}]^3}{\left[\sqrt{\sum_{(i,j) \in R} g(i,j)^2 - g_{ave}^2}\right]^3} \quad (3)$$

(d) Kurtosis (KURT)—measures the peakedness of the gray level histogram relative to the length and size of the tails of the histogram (i.e., those regions to the extreme left and right of the histogram).

$$c = \frac{(1/N) * \sum_{(i,j) \in R} [g(i,j) - g_{ave}]^4}{\left[\sqrt{\sum_{(i,j) \in R} g(i,j)^2 - g_{ave}^2}\right]^4} \quad (4)$$

(e) Entropy (GRAYENT)—characterizes the level of disorder inside the gray level histogram.

$$e = -\sum_k p(k) \ln[p(k)] \quad (5)$$

where:
p(k) is the probability of the $k^{th}$ gray level, i.e. the ratio between its frequency of occurrence and the total number of pixels II. Percentile Measures The second type of first order measures, the percentile measures, provide an additional assessment of the histogram over that provided by the gray level distribution measures. These percentile measures are the:

(a) Lowest Fifth Percentile, which is the gray level below which 5% of the total number of pixels fall on the histogram;

(b) Upper Fifth Percentile, which is the gray level below which 95% of the total number of pixels fall on the histogram;

(c) difference between the MEAN (1) and the Lowest Fifth Percentile;

(d) difference between the Upper Fifth Percentile and the MEAN (1); and (e) ratio between the two differences of (d) and (c), i.e., (Upper Fifth Percentile—MEAN)/(MEAN— Lowest Fifth Percentile).

These percentile measures aid in determining whether the lung parenchyma is diseased as a result of emphysema or other type of pulmonary diseases (e.g., idiopathic pulmonary fibrosis IPF or sarcoidosis). If the lowest fifth percentile gray level of a suspect tissue pathology is significantly lower than that of the norm (i.e., the lowest fifth percentile gray level of a healthy lung), this could typically indicate that the tissue pathology of the lung is emphysema. However, if the highest fifth percentile gray level were significantly higher than the norm, this could typically indicate that the pulmonary tissue pathology is due to either IPF or sarcoidosis.

Second Order Texture Measures

While the first order texture measures provide an indication of the frequency of gray level occurrence within the image, they fail to adequately describe quantitative texture features such as the contrast and local inhomogeneities of the image slice. Accordingly, a series of second order texture measures are taken from the 8-bit edgemented duplicate slice to obtain spatial interdependencies between image elements of the slice, thus providing an adequate characterization of differences in texture of the lung parenchyma.

Specifically, the second order texture measures used to help determine the presence of pulmonary tissue pathology are the run-length matrix measures and the co-occurrence matrix measures. These texture measures are derived from the 8-bit edgemented duplicate slice and are discussed hereinbelow.

I. Run-Length Matrix Measures

To obtain the run-length matrix measures, a run-length matrix is constructed by analyzing the gray levels of the 8-bit edgemented duplicate slice. The size of the matrix is the number of gray levels present in the image by the number of pixels that represent the width or height of the ROI. Thus, in the illustrated embodiment, the size of the matrix is 256×512. The run-length matrix is formed by determining the gray level "run-lengths" that exist within the image slice, where a "run-length" is the number of consecutive, collinear pixels "j" that possess the same gray level "i" within the slice. In other words, a run-length is the number of pixels (having the same gray level) that can be traversed in a "string" of pixels before a difference in gray level occurs.

To determine these run-lengths of the image slice, reference is made to FIGS. 5A–5D, each of which illustrate the same sample ROI having pixels $a_x$ through $e_x$. Although the sample ROI depicted in FIGS. 5A–5D is 5×5 pixels in size, this is merely for simplification purposes, as the actual size of the ROI is 31×31 pixels in one embodiment.

Because the ROI of FIGS. 5A–5D does not provide any indication of direction whatsoever, i.e., the image slice is not directional per se, the run-lengths are determined in the horizontal, vertical, and diagonal directions of the ROI. Accordingly, as shown in FIG. 5A, the run-lengths are first determined in the horizontal (i.e., the zero degree) direction of the ROI by the formation of "pixel-strings" designated by dashed lines 1–5. Subsequent to determining the run-lengths in the horizontal direction, referring to FIG. 5B, the run-lengths are determined in the vertical (i.e., the 90 degree) direction by the formation of pixel-strings 1–5, which are oriented vertically. Subsequently, the run-lengths that are determined in the diagonal direction which have two distinct orientations. Referring to FIG. 5C, pixel-strings 1–7 are orientated at 45 degrees; whereas pixel strings 1–7 of the ROI in FIG. 5D are arranged in a 135 degree orientation. The pixels $a_1$ and $e_5$ of FIG. 5C and pixels $e_1$ and $a_5$ of FIG. 5D, all taken separately, cannot consist of a run-length because a run-length must be at least two pixels in length. Accordingly, pixel-strings are omitted for those corner pixels.

Figure 6:
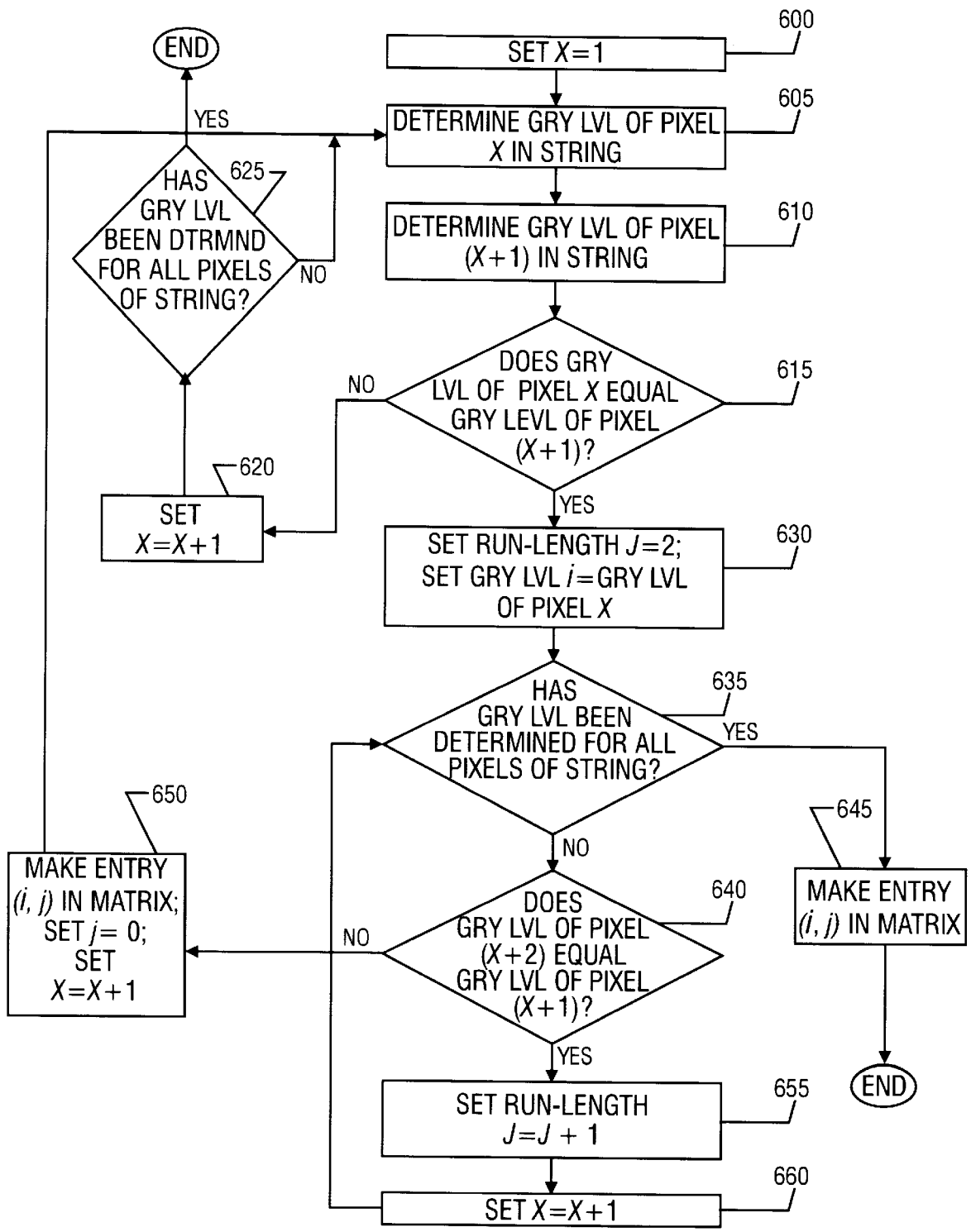
FIG. 6 depicts a process used for determining the existence of run-lengths in a particular pixel-string of FIGS. 5A–5D.

Referring to FIG. 6, a process is shown for determining the existence of run-lengths in a particular pixel-string of the plurality of strings of FIGS. 5A–5D. The process commences at step 600 where a position variable x is initialized with a value of one. The position variable x indicates the position of a particular pixel within the pixel-string. Thus, briefly referring back to FIG. 5A, since position variable x is set equal to one initially, this position would indicate pixels $a_1$, $b_1$, $c_1$, $d_1$, and $e_1$ of pixel strings 1–5, respectively.

In FIG. 5B, position variable x set to one would indicate pixels $a_1$, $a_2$, $a_3$, $a_4$, and $a_5$ of pixel strings 1–5, respectively. For FIG. 5C, pixels $a_2$, $a_3$, $a_4$, $a_5$, $b_5$, $c_5$, and $d_5$ for pixel strings 1–7, respectively. And, for FIG. 5D, pixels $a_4$, $a_3$, $a_2$, $a_1$, $b_1$, $c_1$, and $d_1$ for pixel strings 1–7, respectively. If the position variable x were set equal to two, this would indicate the next successive pixel in the pixel string (i.e., pixels $a_2$, $b_2$, $c_2$, $d_2$, and $e_2$ for FIG. 5A, etc.).

Referring back to FIG. 6, the process continues at step 605 where the gray level of pixel x within the string is determined. Subsequently, the gray level of the pixel x+1 (i.e., the pixel directly adjacent to pixel x within the pixel-string) is determined at step 610. Continuing to step 615, a determination is made as to whether or not the gray level of pixel x is equal to the gray level of pixel x+1. If the gray levels of pixels x and x+1 are not equivalent, the process proceeds to step 620 where the pixel location variable x is incremented by one and at step 625 it is decided whether or not the gray level has been determined for all pixels of the string. If the gray level of all the pixels has been determined, the process ends because no more run-lengths could possibly exist in the pixel-string. However, if all the pixels' gray levels have not been determined, the process reverts back to step 605, where the gray level of the "new" (i.e., incremented) pixel x is determined. On the other hand, if the gray levels of pixel x and x+1 are equal at step 615, then the start of a run-length is detected. As a result, the process continues to step 630, where the run-length variable j is set equal to two and the gray level variable i is set equal to the gray level of pixel x (which is also the same gray level as pixel x+1). Subsequent to setting the variables i and j in step 630, the process proceeds to step 635, where it is decided whether or not the gray level has been determined for all pixels in the pixel string. If the gray level has been determined for all of the pixels in the string, then an entry is made in the run-length matrix at location (i, j) at step 645 and the process ends because all of the run-lengths in the pixel-string have been detected. However, if the gray level has not been determined for all of the pixels in the string, the process continues to step 640 where the gray level of pixel x+2 is obtained and it is determined if its gray level is equivalent to the gray level of pixel x+1. If the two gray levels are not equivalent, at step 650 an entry is made in the run-length matrix at location (i, j), the run-length variable j is reset to zero, and the position variable x is incremented by one. Subsequent to these occurrences at step 650, the process reverts back to step 605 where the gray level of the "new" (i.e., incremented) pixel x is determined. However, if the gray levels of pixels x+2 and x+1 are deemed equivalent in step 640, at step 655 the run-length variable j is incremented by one. The process then continues to step 660, where the pixel position variable x is incremented by one and, subsequently, the process returns to step 635 for determining whether the gray levels have been determined for all pixels of the string.

In short, the above process determines the number of consecutive pixels j of a pixel-string that possess the same gray level i. This process is performed for each of the pixel strings depicted in FIGS. 5A–D. Subsequent to obtaining the run-length variables i and j, entries are made in the run-length matrix indicating how many "runs" within the ROI possess a run-length j occurring at a gray level i.

Since the physical size of a pixel may differ between one image and another, in accordance with one embodiment, the run-lengths j are actually determined in terms of a unit of measurement (e.g., millimeters) as opposed to the number of pixels as described above. That is, two pixel-lengths is approximately 1.172 mm.

Additionally, although in the illustrated embodiment the "run" is defined as a set of consecutive, collinear pixels having the exact same gray level, the "run" could be defined by a set of consecutive, collinear pixels which fall within a certain range of gray levels. The latter, i.e., falling within a certain range of gray levels, would be more advantageous if the image were not edgemented.

Five measures that describe the gray level heterogeneity and tonal distribution of the image are the short run emphasis, long run emphasis, gray level non-uniformity, run length non-uniformity, and run percentage. These measures are derived from the run-length matrix, which was constructed above, and are specifically provided below.

(a) Short Run Emphasis—emphasizes short run-lengths within the ROI, where higher values indicate a presence of shorter run-lengths.

$$SRE = \frac{\sum_{i=1}^{N_g} \sum_{j=1}^{N_r} (1/j^2 * p(i, j))}{\sum_{i=1}^{N_g} \sum_{j=1}^{N_r} p(i, j)} \quad (6)$$

where:
p(i,j) is th $i^{th}$ and $j^{th}$ entry in the run-length matrix
$N_g$ is the number of quantized gray levels
$N_r$ is the number of quantized run-lengths
P is the total number of pixels in the given ROI (b) Long Run Emphasis—emphasizes long run-lengths within the ROI, where higher values indicate a presence of longer run-lengths.

$$LRE = \frac{\sum_{i=1}^{N_g} \sum_{j=1}^{N_r} j^2 p(i, j)}{\sum_{i=1}^{N_g} \sum_{j=1}^{N_r} p(i, j)} \quad (7)$$

(c) Gray Level Non-Uniformity—provides a measure of tonal distribution, where lower values indicate an even distribution of run-lengths throughout the gray levels.

$$GLN = \frac{\sum_{i=1}^{N_g} \left( \sum_{j=1}^{N_r} p(i, j) \right)^2}{\sum_{i=1}^{N_g} \sum_{j=1}^{N_r} p(i, j)} \quad (8)$$

(d) Run Length Non-Uniformity—provides a measure of run-length size distribution, where lower values indicate an even distribution of runs throughout the run-length groups.

$$RLN = \frac{\sum_{j=1}^{N_g} \left( \sum_{i=1}^{N_r} p(i, j) \right)^2}{\sum_{i=1}^{N_g} \sum_{j=1}^{N_r} p(i, j)} \quad (9)$$

(e) Run Percentage—higher values indicate that many short runs are present.

$$RP = \frac{\sum_{i=1}^{N_g} \sum_{j=1}^{N_r} p(i, j)}{P} \quad (10)$$

I. Co-occurrence Matrix Measures

The co-occurrence matrix and its derived parameters recognize that the texture and tone of an image have a mutual dependence and describe the overall spatial relationships that the gray tones of an image have to one another. The co-occurrence matrix is formed by determining the number of times a particular gray level "i" and a particular gray level "j" are separated by a given distance "d" along a direction φ of the image slice. Since, in the illustrated embodiment, the edgemented duplicate slice has 256 gray levels, the size of the matrix is 256 by 256. The formation of the co-occurrence matrix will be better understood from the process illustrated in FIG. 7.

Figure 7:
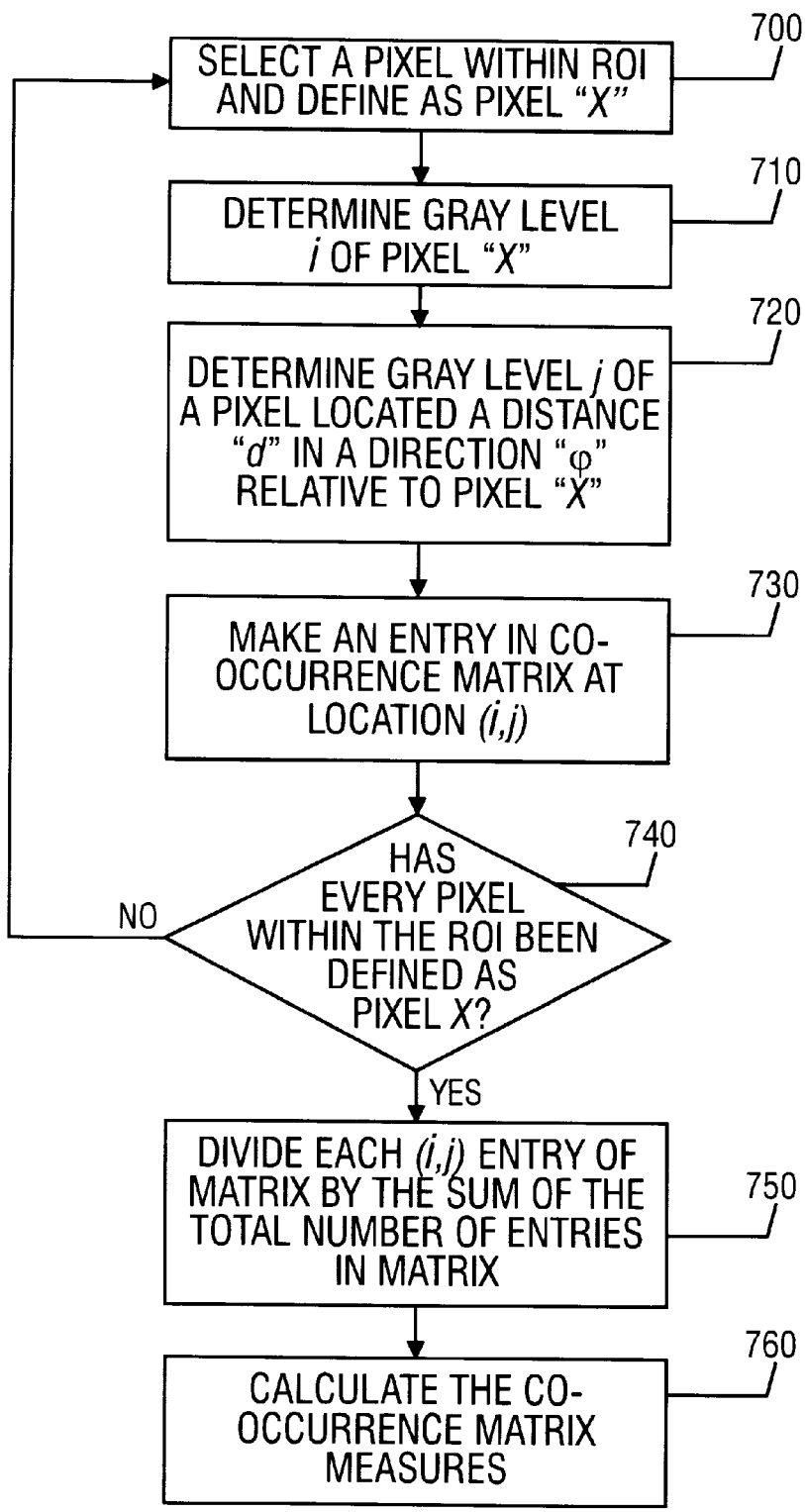
FIG. 7 depicts a process for forming a co-occurrence matrix for calculation of co-occurrence matrix measures.

Referring to FIG. 7, the process commences at step 700 where a pixel is selected within the ROI and defined as pixel "x". At step 710, the gray level i of pixel x within the ROI is determined. Subsequently, at step 720, a gray level j of a pixel residing at a distance d in a direction φ, relative to pixel x, is determined. In one embodiment, the distance "d" is 1.172 mm, which is approximately 2 pixels in length. However, any number of pixels (represented in mm) can be chosen to represent the distance d dependent upon which distance would provide more meaningful results for a particular diagnostic study. The direction φ is 0, 45, 90, 135, 180, 225, 270, and 315 degrees relative to pixel x. Thus, in accordance with the illustrated embodiment, the gray level j of each pixel that is located (approximately) 2 pixels horizontally, vertically, and diagonally from pixel x is determined. Subsequent to obtaining the gray levels j at step 720, entries are made in the co-occurrence matrix, at step 730, indicating the gray levels of pixel x and the gray levels of those pixels which exist a distance d in a direction φ from pixel x. Since the purpose of the co-occurrence matrix is to determine the number of times the same gray level i and j occur at a distance d, these multiple occurrences are summed in their respective locations within the matrix. The process continues for each and every pixel within the ROI, i.e., each pixel of the ROI assumes the role of pixel x. Thus, at step 740, it is then determined whether the last pixel of the ROI was evaluated. If not, the process returns to step 700 where a new pixel is selected from the ROI and is defined as pixel x. On the other hand, if every pixel of the ROI has been defined as pixel x, then the process continues to step 750, where each element of the co-occurrence matrix is normalized by dividing each element by the total number of entries in the matrix. Subsequent to forming the co-occurrence matrix, at step 760 the co-occurrence matrix measures are calculated which emphasizes on the spatial interdependencies of the image elements. These measures are determined from the co-occurrence matrix and, specifically are the entropy, angular second moment, inertia, contrast, correlation, and inverse difference moment provided below.

(a) Entropy—provides indication of the homogeneity of the image, where lower values indicate that the image is homogeneous; whereas higher values indicate inhomogeneity (i.e., indicates a mixture of various gray levels in slice).

$$ENT = -\sum_{i=0}^{N_g-1} \sum_{j=0}^{N_g-1} p(i, j) \ln(p(i, j)) \quad (11)$$

where:

$N_g$ is the number of quantized gray level $p(i,j)$ is the $i^{th}$ and $j^{th}$ entry in the co-occurrence matrix (b) Angular Second Moment—measures the degree of gray level homogeneity in the image and is inversely related to the entropy.

$$ASM = \sum_{i=0}^{N_g-1} \sum_{j=0}^{N_g-1} p(i, j)^2 \quad (12)$$

(c) Inertia $$INER = \sum_{i=0}^{N_g-1} \sum_{j=0}^{N_g-1} (i-j)^2 p(i, j) \quad (13)$$

(d) Contrast—is sensitive to changes in brightness. It is higher when there is a frequent occurrence of large gray level differences inside the ROI.

$$CON = \sum_{i=0}^{N_g-1} \sum_{j=0}^{N_g-1} (i-j)^2 p(i, j)^2 \quad (14)$$

(e) Correlation—measures the degree to which the elements of the matrices are concentrated along the diagonal.

$$CORR = \frac{\sum_{i=0}^{N_g-1} \sum_{j=0}^{N_g-1} (i-\mu_x)(j-\mu_y) p(i, j)}{\sigma_x \sigma_y} \quad (15)$$

where:

$$\mu_x = \sum_{i=0}^{N_g-1} i \sum_{j=0}^{N_g-1} p(i, j) \quad (16)$$

$$\mu_y = \sum_{j=0}^{N_g-1} j \sum_{i=0}^{N_g-1} p(i, j) \quad (17)$$

$$\sigma_x^2 = \sum_{i=0}^{N_g-1} (i-\mu_x)^2 \sum_{j=0}^{N_g-1} p(i, j) \quad (18)$$

$$\sigma_y^2 = \sum_{j=0}^{N_g-1} (i-\mu_y)^2 \sum_{i=0}^{N_g-1} p(i, j) \quad (19)$$

(f) Inverse Difference Moment—measures the lack of variability in the image (also referred to as local homogeneity).

$$IDM = \sum_{i=0}^{N_g-1} \sum_{j=0}^{N_g-1} \frac{1}{1+(i-j)^2} * p(i, j) \quad (20)$$

A further description of the first and second order measure techniques can be found in "Textural Features for Image Classification", by R. M. Haralick et al., I.E.E.E. Transactions Systems, Man and Cybernetics, Vol. 3, pp. 610–621, 1973, the entire contents of which is incorporated herein by reference.

Fractal Analysis

Fractal analysis provides an effective tool for quantitatively characterizing complex natural structures, such as the pulmonary branching structure, which are not well described by classical geometry. In fractal analysis, the complexity of the structure is expressed by the fractal dimension, which reveals how well a fractal object fills the Euclidean space in which it is embedded. The fractal dimension closely resembles a human's intuitive notion of "roughness", thus as the value of the fractal dimension increases, the rougher the texture becomes. Analysis of the lung parenchyma's texture identifies the presence of the amount of structure within the parenchyma. And, ultimately such analysis segregates the lung parenchyma into various tissue pathology classes.

Two types of fractals utilized in the analysis process of the present invention are the stochastic fractal and the geometric fractal. The geometric fractal describes the pulmonary branching structure strictly on a black and white (or "binary") image that augments such branching structure; whereas the stochastic fractal describes the relationship of gray levels. The stochastic fractal dimension, calculated using fractional Brownian motion model concepts, acts as a pre-processing stage for the calculation of the geometric fractal dimension (GFD).

Figure 8:
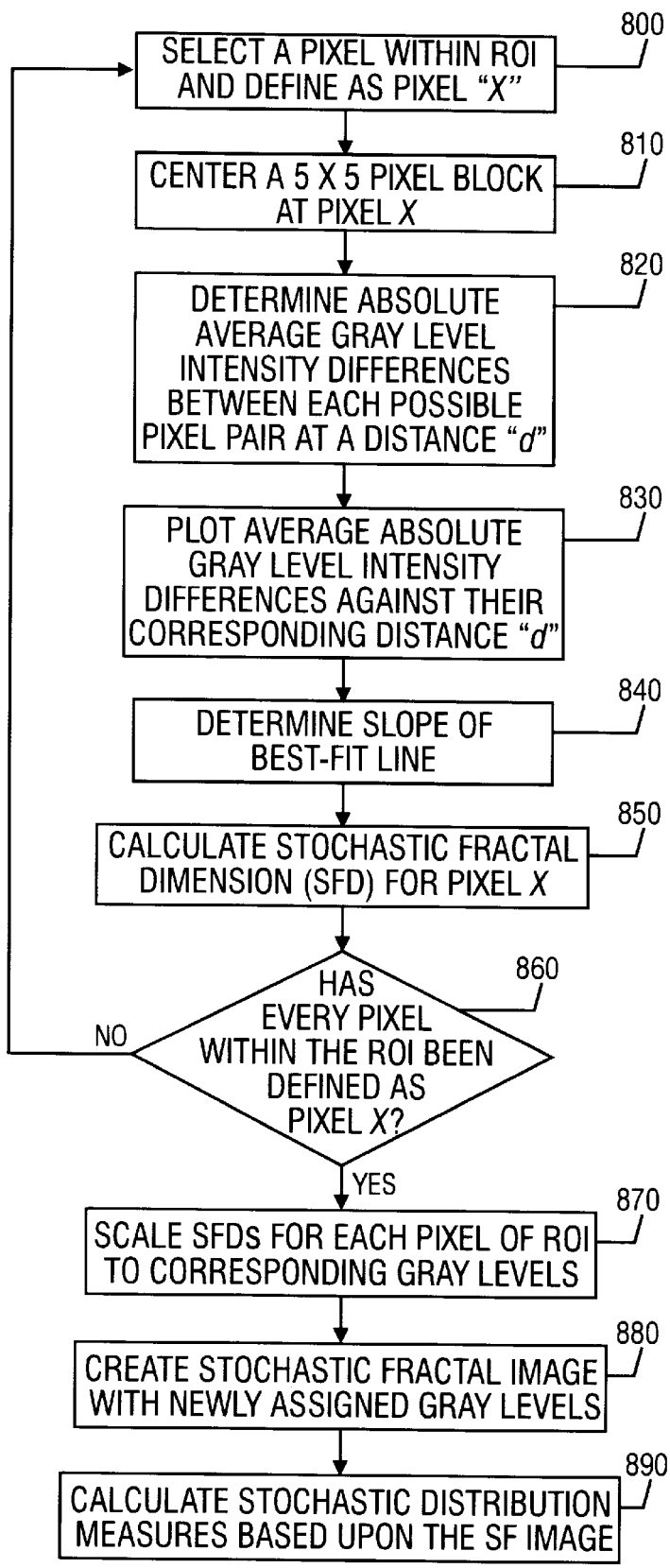
FIG. 8 shows a flowchart that illustrates the process used for calculating a local stochastic fractal dimension (SFD) for each pixel of an ROI.

Referring to FIG. 8, a flowchart is shown that illustrates the process used for calculating the local stochastic fractal dimension (SFD) for each pixel of the ROI. The process begins at step 800 where a pixel within the ROI of the 11-bit original segmented slice is selected and defined as pixel "x". Subsequent to selecting pixel x, a 5×5 pixel block is centered about pixel x at step 810. This pixel block is composed of those pixels neighboring pixel x at a distance of up to two pixel-lengths from pixel x, with pixel x being the center pixel of the 5×5 block. This will be better understood with reference to FIG. 9A, where a sample ROI is shown. Assuming that pixel $d_4$ of the ROI is initially selected to be defined as pixel x, the 5×5 pixel block would encompass all of those pixels surrounding pixel $d_4$ inside the dotted line designated by 910. These pixels surround pixel x (i.e., pixel $d_4$) up to two pixel-lengths and thus form the 5×5 pixel block.

Figure 10:
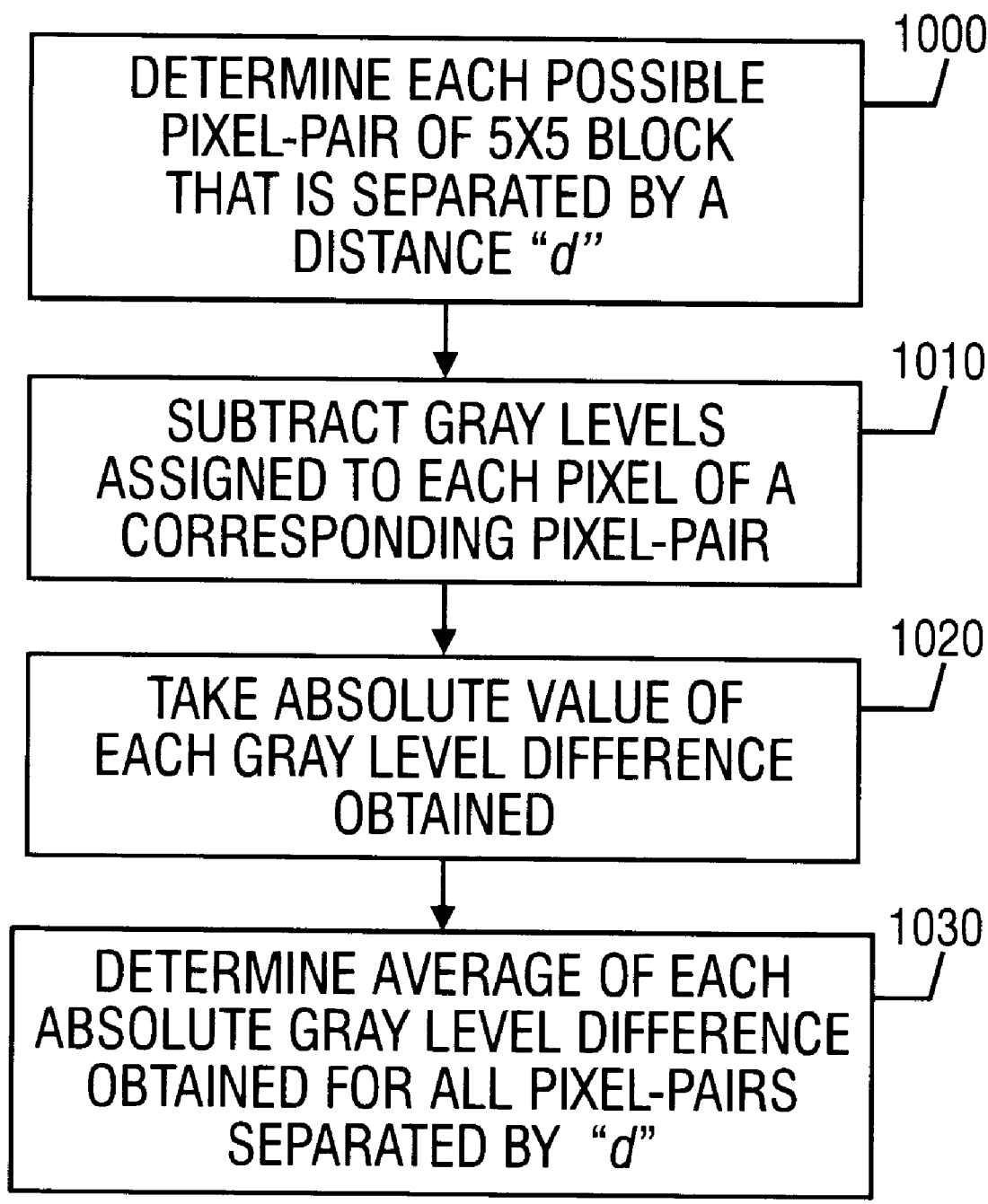
FIG. 10 shows a process for the calculation of average gray level intensity differences between pixel-pairs within the ROI of FIGS. 9A and 9B.

Returning back to FIG. 8, at step 820 the average absolute gray level intensity differences are determined between each possible pixel-pair that are separated from each other by a separation distance "d" within the 5×5 pixel block. The calculation of these average gray level intensity differences will be better understood with reference to the detailed process provided for in FIG. 10.

The process commences at step 1000 where each possible pixel-pair separated by a distance "d" is determined within the 5×5 pixel block. Initially, the separation distance "d" is selected as a value of one pixel-length such that all neighboring (i.e., adjacent) pixels, for each and every pixel in the 5×5 block, separately form a pixel-pair. Referring again to FIG. 9A of the sample 5×5 pixel block, the pixels which are directly adjacent to each pixel of the 5×5 block independently form a pixel-pair. For example, the pixel-pairs relative to pixel $b_2$, are pixel-pair $b_2$ and $c_2$, pixel-pair $b_2$ and $c_3$, and pixel-pair $b_2$ and $b_3$. The pixel-pairs relative to pixel $b_3$ are pixel-pair $b_3$ and $b_2$, pair $b_3$ and $c_2$, pair $b_3$ and $c_3$, pair $b_3$ and $c_4$, and pair $b_3$ and $b_4$. This process continues for each and every pixel of the 5×5 pixel block until all of the possible pixel-pairs are obtained that are separated by the separation distance "d", which is initially one pixel-length. After all of the pixel-pairs are determined when the separation distance "d" is equal to one pixel-length, all possible pixel-pairs are determined for a separation distance "d" equal to two pixel-lengths. For example, the pixel-pairs formed relative to pixel $b_2$, at a separation distance of "d" set equal to two pixel-lengths, are pixel-pair $b_2$ and $d_2$, pair $b_2$ and d3, pair $b_2$ and $d_4$, pair $b_2$ and $c_4$, and pair $b_2$ and $b_4$. After all of the possible pixel-pairs are determined at a separation distance of two pixel-lengths, the separation distance is increased by one pixel-length again (i.e., 3 pixel-lengths, then 4 pixel-lengths, etc.) to determine all possible pixel-pairs at the particular separation distance "d". This continues until a maximum separation distance is achieved between pixel-pairs of the 5×5 block, i.e., until the separation distance "d" forms as pixel-pairs the two pixels at the opposite corers of the 5×5 pixel block, which are pixel-pair $b_2$ and $f_6$ and pixel-pair $f_2$ and $b_6$ in the illustration of FIG. 9A.

Returning back to FIG. 10, once all of the possible pixel-pairs are obtained at their respective separation distances "d " at step 1000, the process continues to step 1010 where the difference of gray levels of each pixel-pair is determined at their respective separation distance "d." Thus, taking pixel-pair $b_2$ and $b_3$ for example, the gray level assigned to pixel $b_2$ is subtracted from the gray level assigned to pixel $b_3$. This operation is performed for each and every pixel-pair obtained in step 1000 above. Subsequently, at step 1020, the absolute value of all the gray level differences is taken such that all of the gray level differences are positive values. Finally, at step 1030, the average is taken of all the absolute gray level intensity differences (obtained in step 1020) for each respective separation distance "d." Thus, a single average absolute gray level intensity difference value is obtained for each respective separation distance "d."

Referring back to FIG. 8, subsequent to determining these average absolute intensity differences in step 820, the process continues to step 830 for determining the stochastic fractal dimension (SFD). At step 830, a plot is made on a log-log scale that graphs the average absolute gray level intensity differences against their respective separation distance "d", which was obtained in step 820. After obtaining this plot, the slope of the best-fit line is determined at step 840. Subsequently, the local stochastic fractal dimension (SFD) is calculated at step 850 using the formula shown below by plugging in the slope value obtained from step 840 above.

$$SFD=3-\text{slope} \quad (21)$$

Once the SFD value is obtained, the significance of pixel x is again important, as this SFD value is assigned to pixel x (i.e., the pixel located at the center of the 5×5 pixel block). The SFD is similarly calculated for each and every pixel of the ROI, i.e., each and every pixel of the ROI "plays the role" of pixel x. Therefore, at step 860 it is determined whether or not every pixel within the ROI has been defined as pixel x. If not, the process reverts back to step 800 where another pixel within the ROI is selected to calculate its SFD value. At the point where a new pixel x is defined, the 5×5 pixel block is essentially shifted such that the new pixel x is at the center of the 5×5 block (note FIG. 9B, where pixel $d_5$ is designated as the new pixel x), and the process for calculating the SFD is repeated for that new pixel x. If, however, all of the pixels within the ROI have been defined as pixel x, the process continues to step 870 where the SFD values for each pixel of the ROI are "scaled" to a new corresponding gray level value. This is accomplished by assigning the pixel of the ROI having the lowest SFD value a gray level of zero, and assigning the pixel having the highest SFD value a gray level of 2,047. Accordingly, all of the remaining pixels in the ROI, which fall between the highest and lowest SFD values, are respectively scaled and assigned a corresponding gray level between 0 and 2,047. Thus, all of the pixels of the ROI are assigned a new gray level based upon each pixel's respective calculated SFD value. Accordingly, at step 880, a new "stochastic fractal" (SF) image is obtained with the pixels having their new gray levels assigned thereto based upon their respective calculated SFD values. Subsequent to creating the SF image, at step 890, the gray level distribution measures of the SF image are calculated using the same formulae (1)–(5) that were used to calculate the gray level distribution measures of the original 11-bit segmented image. Specifically, these gray level distribution measures are the SFD mean, SFD variance, SFD skewness, SFD kurtosis, and SFD entropy and are obtained from a gray level histogram derived from the SF image.

The stochastic fractal (SF) image created is essentially an enhancement of the 11-bit original segmented image. Specifically, the SF image intensifies the edges of the image, thus causing the pulmonary structure to be more pronounced. This is especially beneficial for the calculation of the geometric fractal dimension (GFD), which assesses the amount of structure that makes up the lung parenchyma. The process utilized for the calculation of the GFD for the ROI is illustrated in FIG. 1, the description of which is set forth below.

The process begins at step 1100, where a new image is created by performing a gray level thresholding technique on the stochastic fractal (SF) image. With this technique, all pixels of the SF image which are equal to or greater than gray level 800 are made "black" and all of the pixels that possess a gray level below 800 are made "white." Thus, a new "binary" image is formed that comprises only pixels which are black or white. Essentially, the purpose for this gray level thresholding technique is to eliminate minute or undeveloped structures of the image such that the more pronounced or dominant structures can be focused upon for assessing a particular tissue pathology class to the area in question. Subsequent to forming this binary image at step 1100, the process continues to step 1110 where the binary image is super-imposed on a grid of "super-pixels" of increasing size "e." The process of super-imposing the binary image with these "super-pixels" will be better understood with reference to FIG. 12A.

Figure 12A:
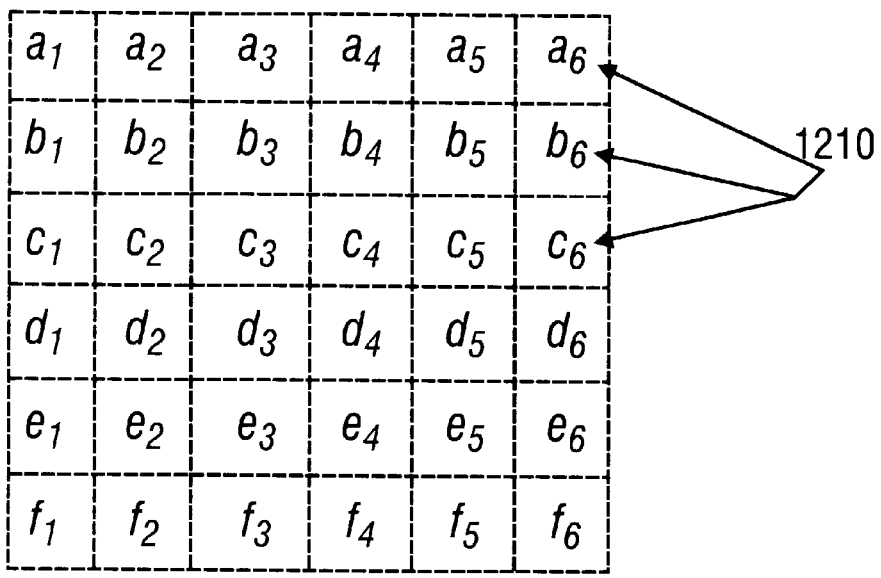
FIGS. 12A and 12B show a sample image slice with a plurality of pixels imposed on a grid of super-pixels.
Figure 12B:
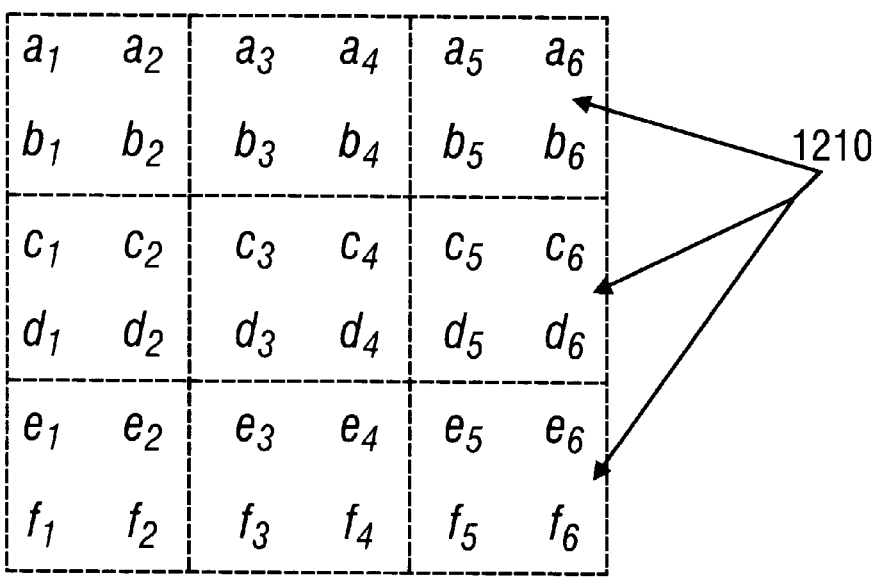

As shown in FIG. 12A, a sample image slice is depicted with a plurality of pixels $a_1$ through $f_6$. Although the sample image slice shown is 6×6 pixels in size, this is merely for simplification purposes as the actual size of the image slice is 512×512 pixels. Initially, these pixels are super-imposed on a grid of "super-pixels" of size one (i.e., "e" is set equal to 1), where there is a direct one-to-one correspondence between the pixels of the image slice and the super-pixels, which are designated by the dotted-line boxes 1210. Subsequently, the super-pixel size is increased to two (i.e., "e" is set equal to 2) such that 2×2 pixels of the image slice form a super-pixel 1210, as depicted in FIG. 12B. The super-pixel size is then increased by one value until a maximum of 10×10 pixels of the image slice form a super-pixel, i.e., "e" is set equal to 3, then 4, then 5, etc. until a maximum value of 10 is reached.

Figure 11:
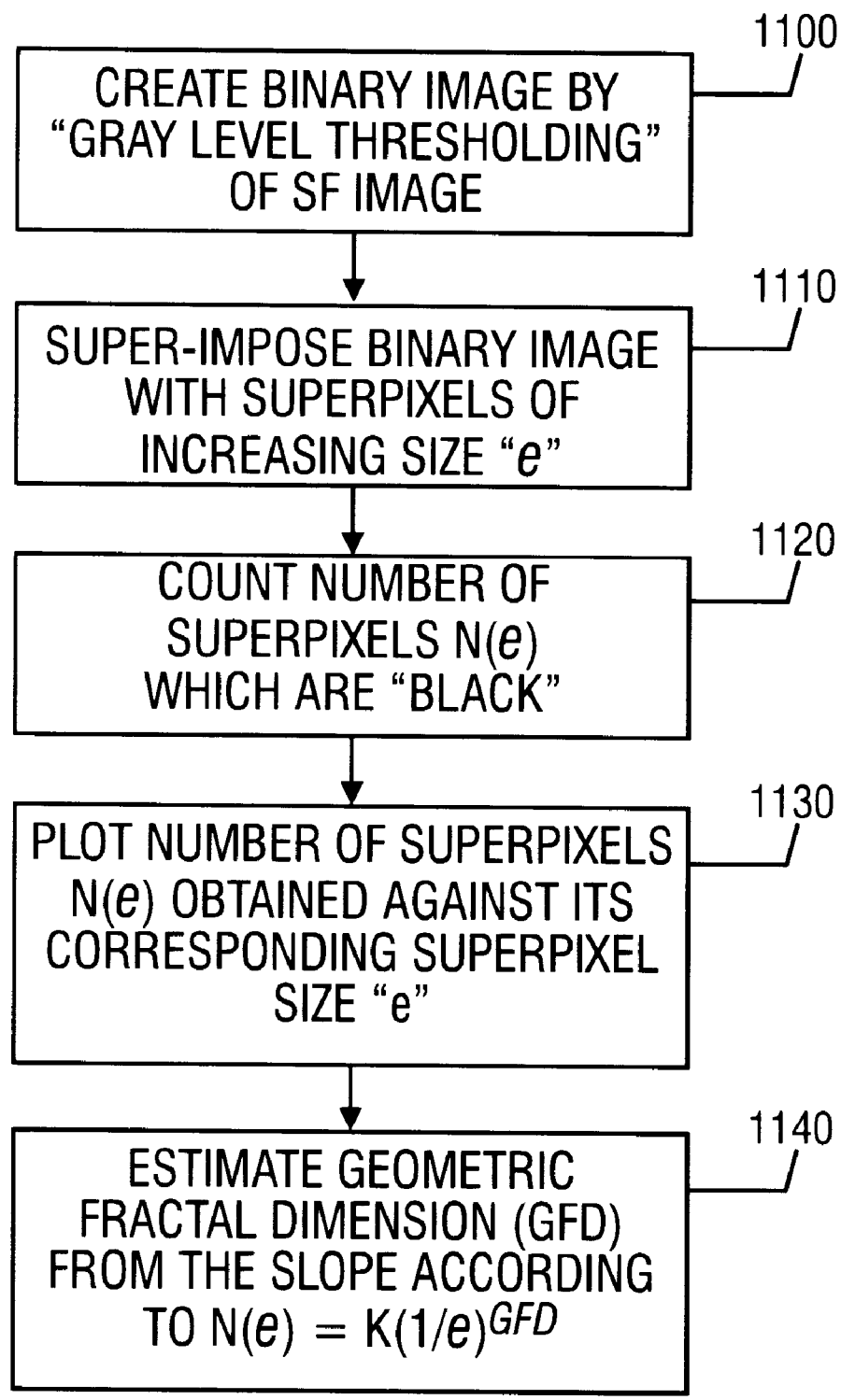
FIG. 11 illustrates a process utilized for calculating a geometric fractal dimension (GFD)

Subsequent to super-imposing the image slice on the super-pixel grids of increasing size e, at step 1120 (FIG. 11), the number of super-pixels (i.e., N(e)) that possess a black pixel are counted within a particular ROI of the super-imposed image slice. That is, if any one pixel within the super-pixel is black, the super-pixel is thus considered to be black. The counting of the number of black super-pixels (within a particular ROI) is performed on each of the super-pixel grids from size "e"=1 to "e"=10. After determining the number of super-pixels which are black in a particular ROI for each super-pixel grid size, the process continues to step 1130, where a plot is made of the number of black super-pixels N(e) for the ROI against its respective super-pixel size "e." Finally, at step 1140, the geometric fractal dimension (GFD) of the particular ROI can be estimated from the slope according to the formula appearing below.

$$N(e) = K(1/e)^{GFD} \qquad (22)$$

The geometric fractal dimension (GFD) provides a quantitative indication of a particular tissue pathology in the ROI for which it was calculated. A lower value GFD (i.e., a fewer amount of black super-pixels) will indicate a lack of structure in the lung parenchyma; whereas, a higher value GFD will indicate more structure (i.e., an increased presence of black super-pixels). Accordingly, a lower GFD value could suggest emphysematous tissue since there is a lack of structure due to breakdown of the alveolar walls of the lung parenchyma. On the other hand, a higher GFD value could suggest an increased presence of more structure , e.g., thickening of the blood vessels, which is characteristic of IPF and sarcoid.

A further description of fractal analysis theory can be found in "Fractal Analysis of High-Resolution CT Images as a Tool for Quantification of Lung Tissue pathology", by R. Uppaluri et al., Medical Imaging 1995: Physiology and Function from Multidimensional Images, Vol. 2433, pp. 133–142, 1995, the entire contents of which is incorporated herein by reference.

Optimal Feature Selection

The set of features that were determined from the ROI in step 135 of FIG. 1, i.e., the first and second order texture measures and the fractal dimension, often contain redundant features or features which fail to lend themselves to properly identify a particular class of tissue pathology. Accordingly, at step 140, an optimal feature selection technique is performed to select those features which are mutually independent from the other calculated features, thus providing a more accurate set of features that is useful for determining the presence of a particular class of tissue pathology. The optimal feature selection is performed using training samples (which will be described later).

In order to perform the optimal feature selection technique, the "divergence" measure is utilized along with a correlation analysis procedure. Specifically, the divergence measure is used to indicate the "strength" of a feature in determining a particular class of tissue pathology; whereas correlation analysis is utilized to remove the redundant features.

When a Gaussian distribution of features is assumed, the divergence of a set of features x is defined as:

$$J(S_1, S_2) = \int_{-\infty}^{\infty} [p(x|S_1) - p(x|S_2)] \ln\left[\frac{p(x|S_1)}{p(x|S_2)}\right] dx \quad (23)$$

where:

x is an R-dimensional vector $S_1$, $S_2$ denote two tissue pathology classes if classes $S_1$ and $S_2$ are assumed to be multi-variate Gaussian distributed, the R-dimensional x vector is distibuted as:

$$p(x|S_k) \sim N(\mu_k)[\phi_k]), \ k=1,2 \quad (24)$$

where:

$\mu_k$ is a mean vector $\phi_k$ is a covariance matrix for each tissue pathology class Assuming that the total number of features is R, it is desirable to determine which subset of features N, taken together, is optimal from R (i.e., most useful for determining a class of tissue pathology). Accordingly, the divergence of R features can be calculated one at a time and, thus, N of those features with the highest divergence value is chosen.

Providing that Gaussian statistics are assumed and the features are evaluated one at a time, the divergence measure of the $i^{th}$ feature is:

$$J(S_1, S_2, i) = \frac{(\sigma_1^{(i)} - \sigma_2^{(i)})^2 + (\sigma_1^{(i)} + \sigma_2^{(i)})(\mu_1^{(i)} - \mu_2^{(i)})^2}{2\sigma_1^i \sigma_2^i} \quad i = 1, \ldots, R \quad (25)$$

where:

$\sigma_k^i$, $\mu_k^i$ are the variance and the mean, respectively, of feature i and class k The divergence measure, provided for above, is only defined for a two-class situation (e.g., emphysema and normal tissue). However, in order to account for additional tissue pathology classes (i.e., where k>2), the sum of the paired divergences is used as an optimization criterion.

If two of the features are highly correlated, those features are redundant and, thus, are of little value in determining different types of tissue pathology classes. Accordingly, to identify the degree of correlation between the features, correlation analysis is performed. Again, assuming that the total number of features is R, a correlation matrix C is formed which is R×R in size, such that:

$$C = [p_{ij}] \quad (26)$$

where the correlation coefficient $P_{ij}$ is related to the sample of covariances by:

$$p_{ij} = \frac{\sigma_{ij}}{\sqrt{\sigma_{ii}\sigma_{jj}}} \quad i, j = 1, \ldots, R \quad (27)$$

Since $0 \leq p_{ij2} \leq 1$, where $p_{ij}^2 = 0$ for uncorrelated features and $p_{ij}^2 = 1$ for correlated features, $p_{ij}^2$ essentially is a similarity function for the features.

The final N features (i.e., the optimal features) are selected by ordering the R original features by the divergence measure and retaining only those features whose absolute value of $p_{ij}$ (i≠j), with all previously accepted features, does not exceed 0.8.

A further description of the optimal feature selection process can be found in "Introduction to Mathematical Techniques in Pattern Recognition", by H. C. Andrews, Wiley, New York, 1972, the entire contents of which is incorporated herein by reference.

Classification of Tissue Pathology Patterns

1. Training the Classifier

The analysis of the image slice described heretofore performs a series of first order, second order and fractal measures on the slice, thus quantitatively assessing the image. However, these quantitative measures are mere calculations and, therefore, these calculations need to be translated into a corresponding tissue pathology class to provide meaningful results to the user of the present invention. Therefore, the present invention employs a classifier which classifies the ROIs of the image slice into six different tissue pathology classes, in accordance with one embodiment. The tissue pathology classes are emphysema-like, honeycombing, ground glass, broncho vascular bundles, nodular pattern, and normal, all the characteristics of which are provided for below.

| Tissue Pathology | Characteristics of Tissue Pathology |
|---|---|
| Emphysema-like | Caused by destruction of tissue, which forms large air spaces. The air spaces appear dark since air manifests itself on CT images as low gray levels. |
| Honeycombing | Characterized by small air sacs (that appear dark) surrounded by bright fibrous tissue. Predominantly caused by IPF; however, in some instances, it has also been linked to sarcoid. |
| Ground Glass | Represents peripheral lung tissue pathology that is caused by the filling of the aveolar spaces with fluid, cells, or fibrous tissue. This leads to an increased density and a relative homogenous appearance. Commonly associated with IPF, but has also been linked to sarcoid in some instances. |
| Broncho Vascular Bundles | Characterized by blood vessels and bronchi which may be thickened as a result of disease, but may also represent normal vascular or bronchial structures. Predominantly associated with sarcoid, but has also been linked to IPF. |
| Nodular Pattern | Characterized by very subtle bright spots over a background of normal tissue. A primary indicator of sarcoid; however in some cases, it has been linked to IPF. |
| Normal | Composed of air-contained alveolar tissue interspersed with blood vessels. The blood vessels appear bright and the air-contained regions appear dark on the CT image. |

In order for the classifier of the present invention to properly translate and classify the optimal features N (as determined in step 140) into the proper tissue pathology class, the classifier needs to be trained (or initialized) based upon prior samples (or examples). Accordingly, at least two trained observers (e.g., pulmonologists) independently assess a series of sample images of the lung (i.e., a "training set" of images). Each one of the trained observers outlines regions on the image slice and classifies each region to a respective tissue pathology class based upon his or her prior experience. Only those regions of the image slice which the trained observers agree upon a particular tissue pathology class, are provided as samples to the classifier of the present invention. Subsequent to the "agreed-upon" image samples being classified by the trained observers, the images are quantitatively assessed using the techniques of steps 105 through 135 of FIG. 1. That is, the first and second order texture measures and fractal measures are performed on these image samples. After the samples have been quantitatively assessed, the quantitative measurements are associated with the particular tissue pathology class assigned by the trained observers. This information is then stored such that a determination of tissue pathology classes can be made on future image slice evaluations without the assistance of the trained observers.

The aforementioned process for training the classifier need only be performed once prior to performing a diagnostical analysis of subsequent CT images. However, the classifier can be updated with additional samples. Furthermore, the classifier can be trained with samples of additional tissue pathology classes in addition to the six tissue pathology classes described above.

2. Classification of Tissue Pathology by the Classifier

Once the classifier has been provided with the tissue pathology samples, the classifier takes the optimal features N, obtained in step 140, and classifies the ROI as a particular tissue pathology class at step 145 using the features N and the samples.

The actual classification process is accomplished utilizing a Bayesian (non-linear statistical) classification scheme, which is based upon a minimum loss optimality criterion and is constructed using a posteriori probabilities.

In order for the classifier to determine which tissue pathology class a particular ROI of the image slice belongs to, the probability of the ROI matching a particular tissue pathology class needs to be determined. This is accomplished using the probability density function $p(x|\omega_r)$ formula shown below, which indicates the probability that an "unclassified ROI belongs to a particular tissue pathology class.

$$p(x|\omega_r) = \frac{1}{(2\pi)^{n/2}\sqrt{(det\Psi_r)}} \exp\left[\frac{-1}{2}(x-\mu_r)^T\Psi_r^{-1}(x-\mu_r)\right] \quad (28)$$

where:

$p(x|\omega_r)r)$ is the probability that the ROI belongs to a particular tissue pathology class $\omega_r$ x denotes a feature vector containing the optimal features N for the ROI n is the number of features in the feature vector x;

$\mu_r$ denotes the mean feature vector from all the examples for each tissue pathology class $\Psi_r$ is the dispersion matrix for each tissue pathology class also computed using the examples Subsequent to calculating the probability that the ROI belongs to each particular tissue pathology class $\omega_r$, the a posteriori probability can be computed from a priori probabilities using Bayes formula:

$$P(\omega_r|x) = \frac{p(x|\omega_r)P(\omega_r)}{p(x)} \quad (29)$$

where:

p(x) is the mixture density $P(\omega_r)$ is the a priori probability of class $\omega_r$ $$P(\omega_r)=K_r/K,$$

where:

$K_r$ is the number of examples of $\omega_r$ in the training set
K is the total number of samples in the training set In equation (29) above, the values of $P(\omega_r)$ and p(x) are constants and thus cancel out of the equation. Accordingly, the a posteriori probability $P(\omega_r|x)$ is approximately equal to the probability density $p(x|\omega_r)$. From these a posteriori probabilities determined for each tissue pathology class $\omega_r$ of the training set, the tissue pathology class to which the ROI belongs is the tissue pathology class associated with the highest probability $P(\omega_r|x)$ as shown in equation (30) below.

$$P(\omega_r|x)=\max_{r=1\ldots R}P(\omega_r|x) \quad (30)$$

Subsequent to determining the tissue pathology class to which the ROI belongs, the process ends at step 150 where a color-coded classification label is assigned to the classified region. Since the 31×31 ROIs overlap by 15×15, the color coded classification label is assigned to the 15×15 block centered in the ROI. The color-codes that can be assigned to this 15×15 block are emphysema-like—black, honeycombing—blue, ground glass—navy blue, broncho vascular bundles—red, nodular pattern—yellow, and normal—sky blue. In addition, if the highest probability, obtained from equation (30) above, yielded a tissue pathology class of less than 90%, a color-coded label of white is assigned to the region, thus indicating that the region could not be classified with at least 90% confidence.

A further description of the Bayesian classifier can be found in "Image Processing, Analysis, and Machine Vision", by M. Sonka et al., Chapman & Hall, London, 1993, the entire contents of which is incorporated herein by reference.

The System

Figure 13:
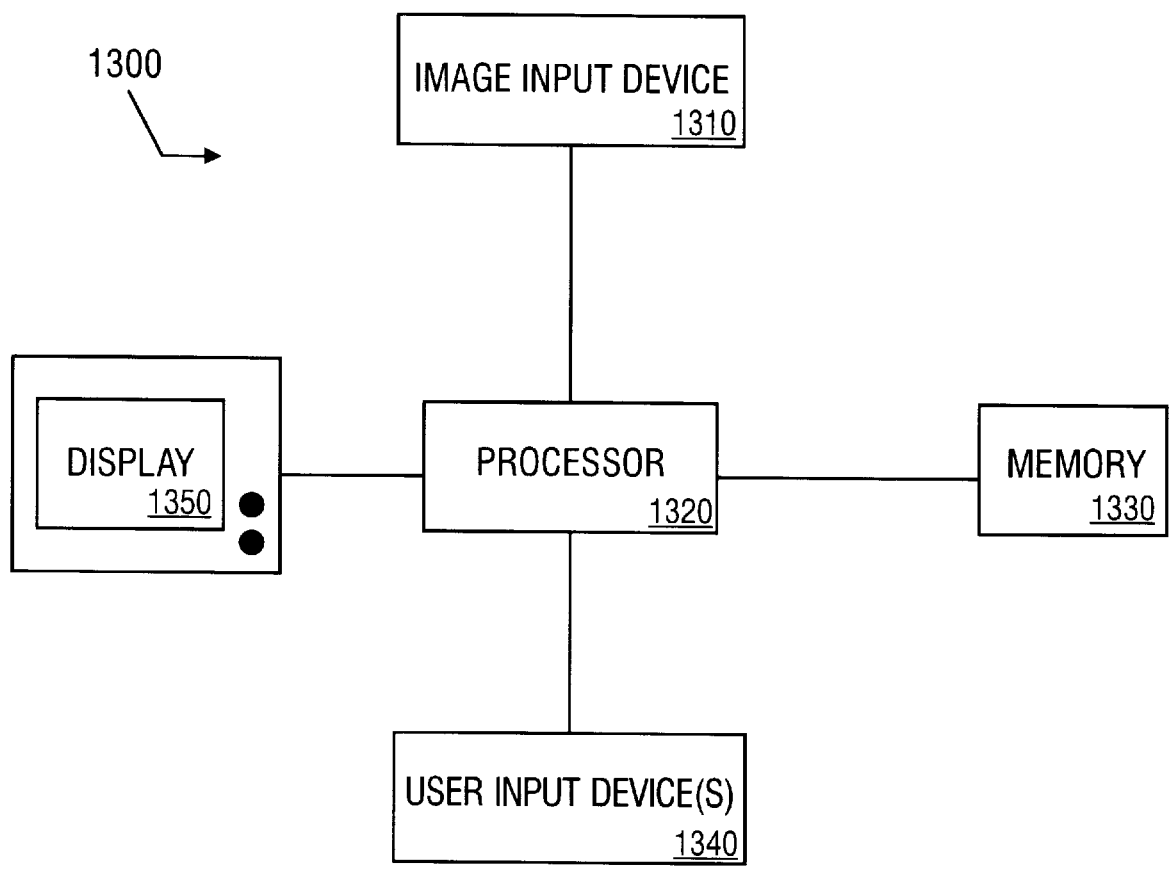
FIG. 13 illustrates a block diagram of a system that performs the objective image analysis procedure of FIG. 1.

Referring to FIG. 13, a system 1300 is shown that performs the objective image analysis procedure of FIG. 1. In the illustrated embodiment, system 1300 is a UNIX workstation; however, it is conceivable that other types of computer systems can be used in lieu of the UNIX workstation without departing from the scope of the invention. System 1300 comprises an image-input device 1310 that receives a digital representation of the CT image directly from a CT scanner (not shown). Coupled to the image input device 1310 is processor 1320, which controls the overall operation of system 1300 and evaluates the CT image by calculating the objective texture measures. The processor 1320 receives its instructions from memory 1330, which has computer code stored therein. In the illustrated embodiment of the invention, the computer code is written in the "C" programming language; however, it will be appreciated that other computer programming languages can be used to program system 1300 without departing from the spirit and scope of the invention. The actual computer code used to implement the present invention is attached to Appendix A of this application.

The memory 1330 further stores the objective parameters associated with the sample images of the training set, after the system 1300 is trained (initialized), in order to perform the classification process.

System 1300 further includes user-input devices 1340 that allow the user to interact with system 1300 and a display 1350 that provides the objective analysis of the CT image in visual form to the user by indication of the color-coded tissue pathology class regions of the image. In accordance with the illustrated embodiment of the invention, the user-input devices 1340 are a computer mouse, which permits the user to select a plurality of "on-screen" options from display 1350, and a keyboard for entry of numerical data. However, other types of user-input devices can be used in lieu of the mouse, such as a trackball, touchpad, touchscreen, voice recognition, sole use of the keyboard, or the like without departing from the spirit and scope of the invention.

Figure 14:
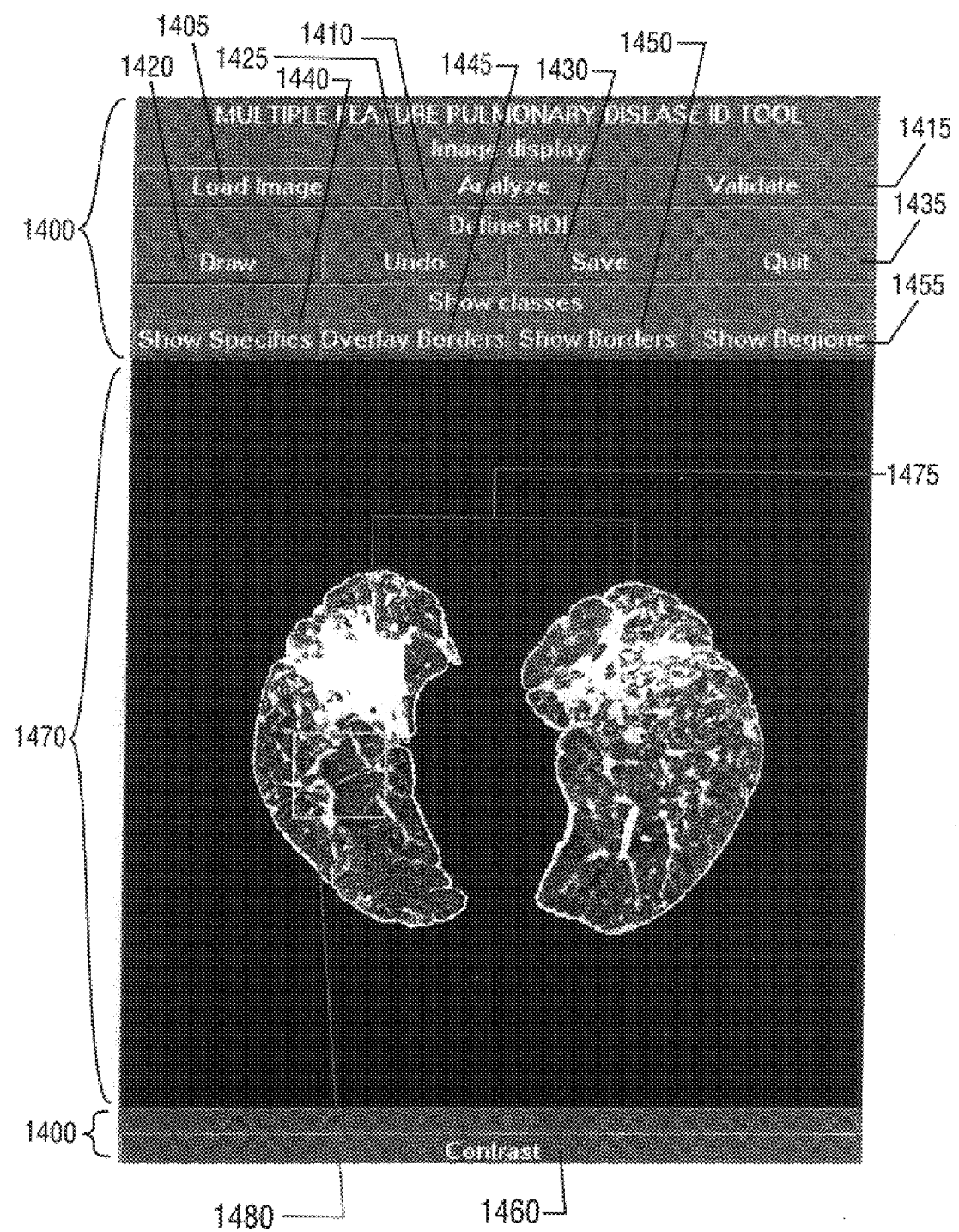

The display 1350, shown in more detail in FIG. 14, depicts a graphic user interface (GUI) section 1400 that includes a plurality of graphic buttons 1405–1460, which allow the user to interact with system 1300 via the user-input devices 1340.

Figure 15:
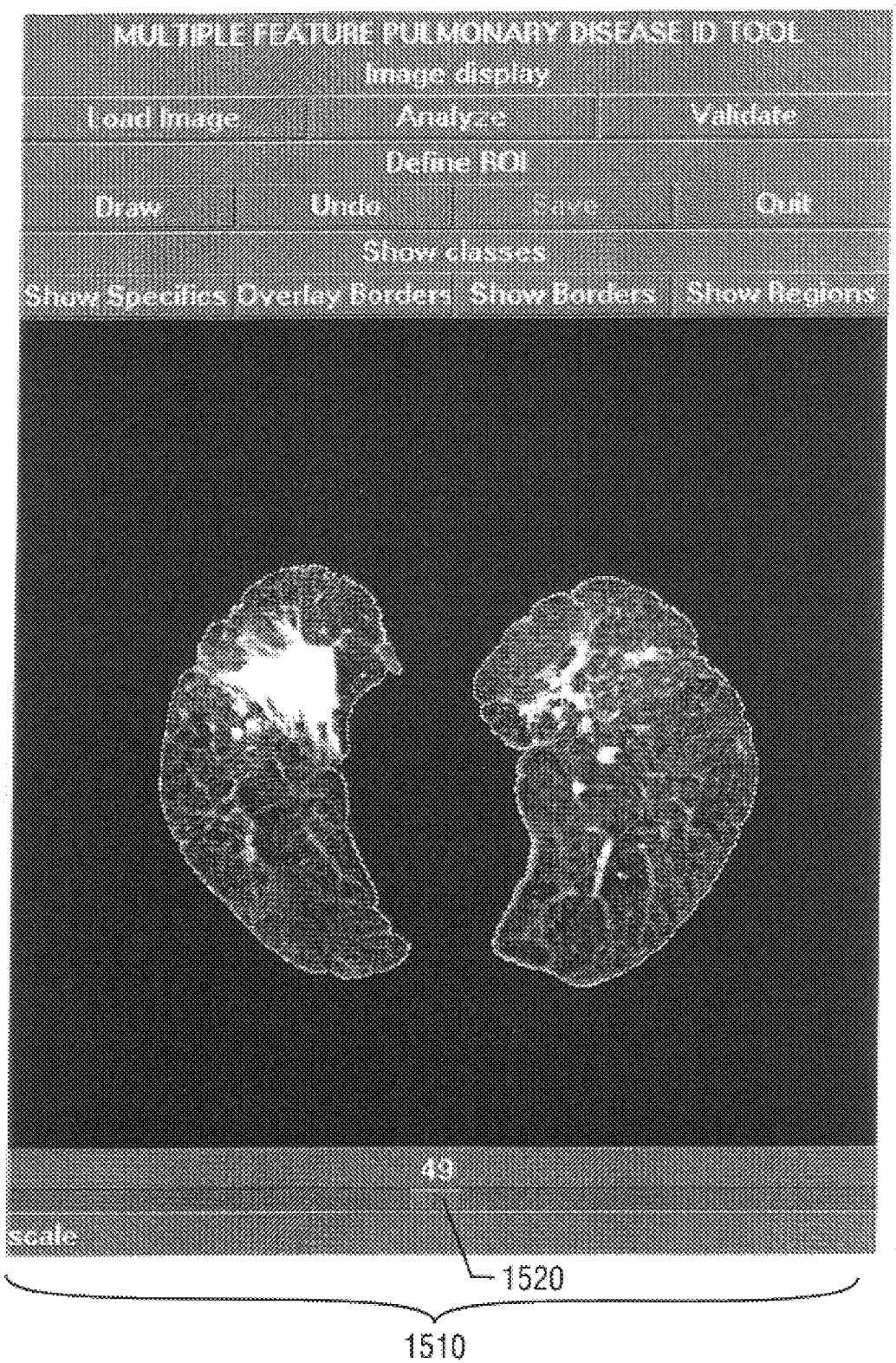

The user can load a CT image by selecting the LOAD IMAGE button 1405 with the mouse 1340. Subsequent to selection of this button, the desired CT image 1475 is displayed in an image display section 1470. The user is further given the option to adjust the contrast of the image 1475 via a CONTRAST button 1460 that appears at the bottom of the display 1350. When the user selects the CONTRAST button 1460, a contrast adjustment scale 1510 appears at the bottom of the screen, as depicted in FIG. 15, which permits the user to lighten or darken the image 1475 by moving the pointer 1520 to the left or right, respectively, utilizing the mouse 1340.

Figure 16:
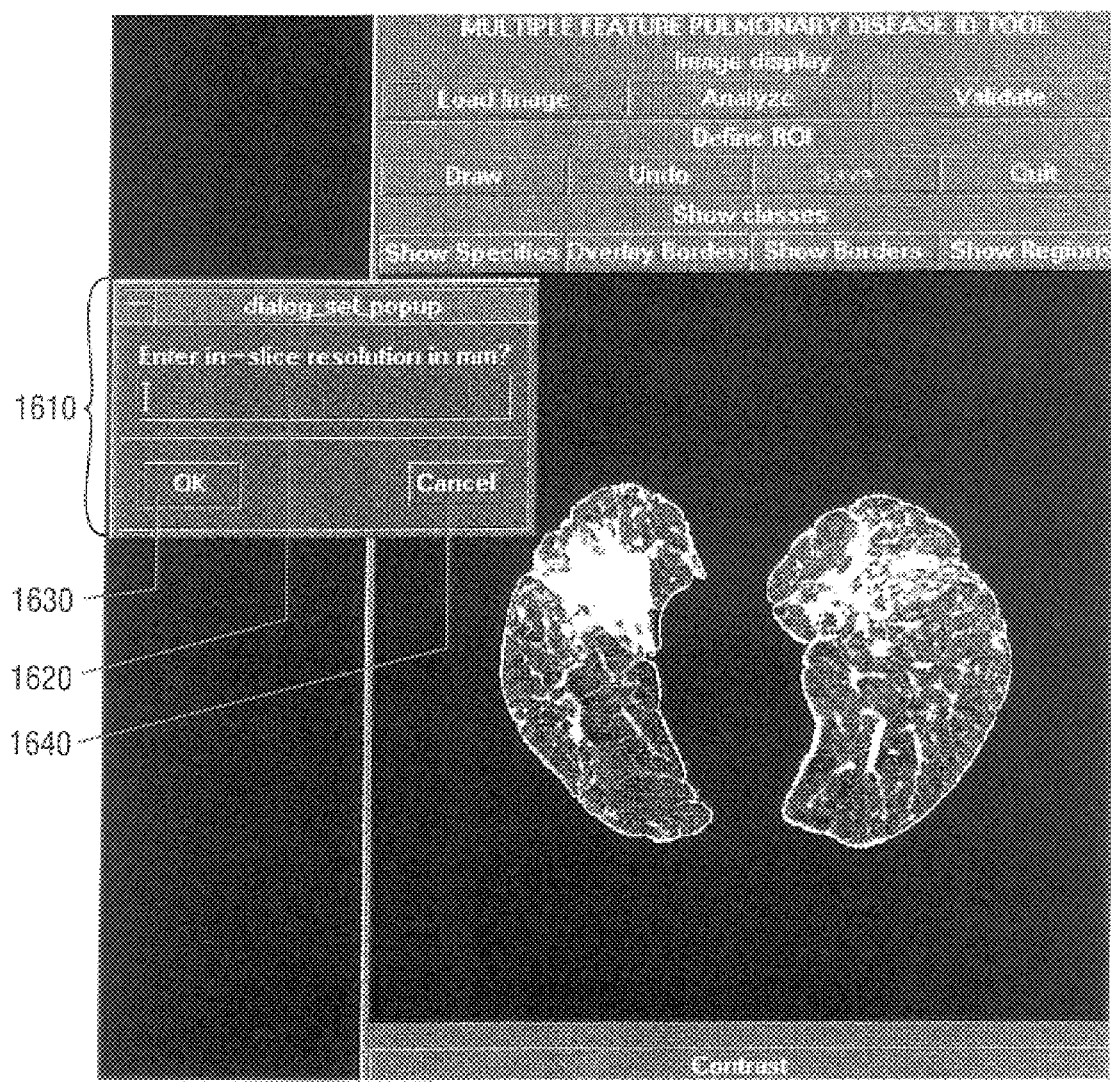

The graphic user interface section 1400 further includes an ANALYZE button 1410, which has the system 1300 evaluate the loaded image 1475 in its entirety. After the ANALYZE button 1410 is selected, a dialog window 1610, as shown in FIG. 16, appears and prompts the user for the "in-slice resolution" of the image slice. The user can then enter the "in-slice resolution", which indicates the physical length of the pixels within the image slice, via the numeric entry field 1620. Subsequently, the user can click the OK button 1630 to submit the numeric entry to the processor 1320 or click the CANCEL button 1640 to terminate the "in-slice resolution" option. After providing the "in-slice resolution", the entire image slice 1475 is evaluated by system 1300 for determining normal or diseased regions of the slice.

As opposed to having the entire image slice evaluated, the user can select a particular region on the image slice 1475 such that system 1300 will evaluate only the selected region. This is accomplished by the DRAW button 1420, which allows the user to define the region of interest on the displayed image 1475. It is important to note that the region of interest selected by the DRAW button 1420 is different than the aforementioned region of interest (i.e., the 31×31 ROI window) described previously for calculating the objective texture measures. Evaluation is performed within the drawn ROI using 31×31 windows in one embodiment. The DRAW button 1420, on the other hand, permits the user to focus on a particular region of the displayed image 1475. After selecting the DRAW button 1420, the user places a mouse pointer on the displayed image 1475 and "draws" a rectangular region 1480 via the mouse 1340 on a desired region of the image 1475, thereby defining the region of interest. The rectangular region 1480 can be of any size desired by the user. The user is also given the option to edit (or re-define) the rectangular region 1480 by selection of the UNDO button 1425; to save the defined region in memory 1330 by selection of the SAVE button 1430; or terminate the draw option altogether by selection of the QUIT button 1435. Subsequent to defining the region of interest with the DRAW option, the user can select the ANALYZE button 1410 to have only the defined region evaluated by system 1300.

Figure 17:
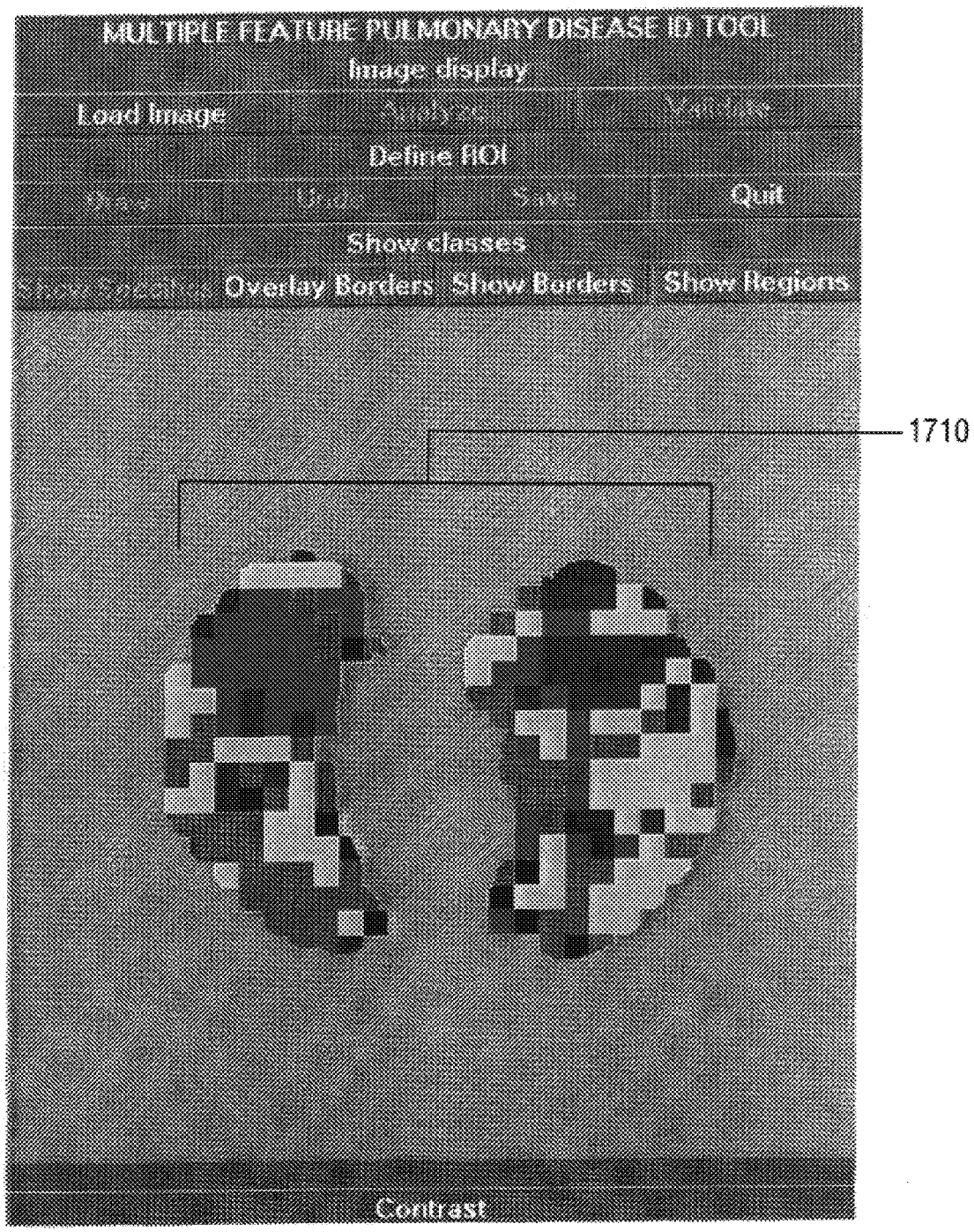
Figure 18:
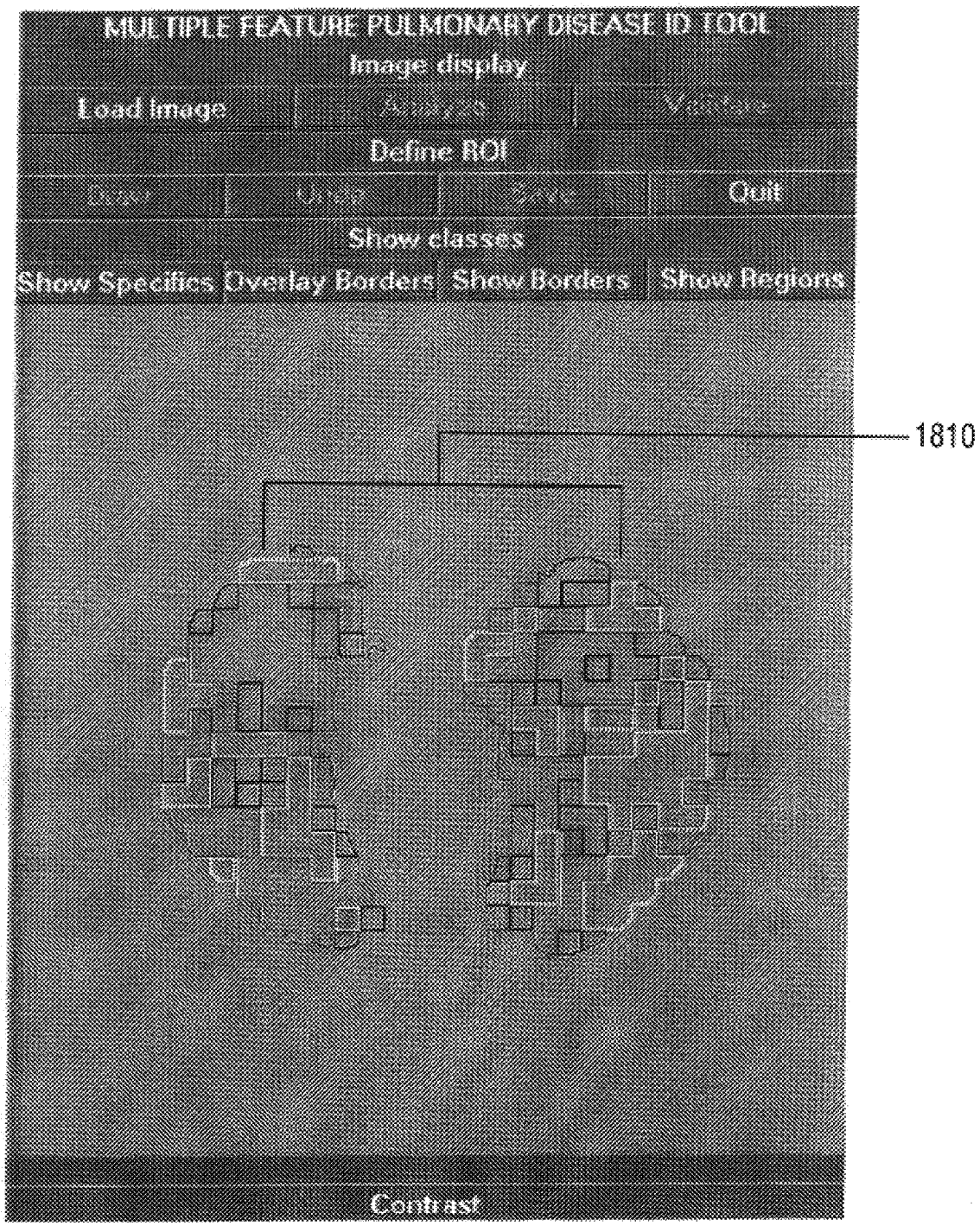
Figure 19:
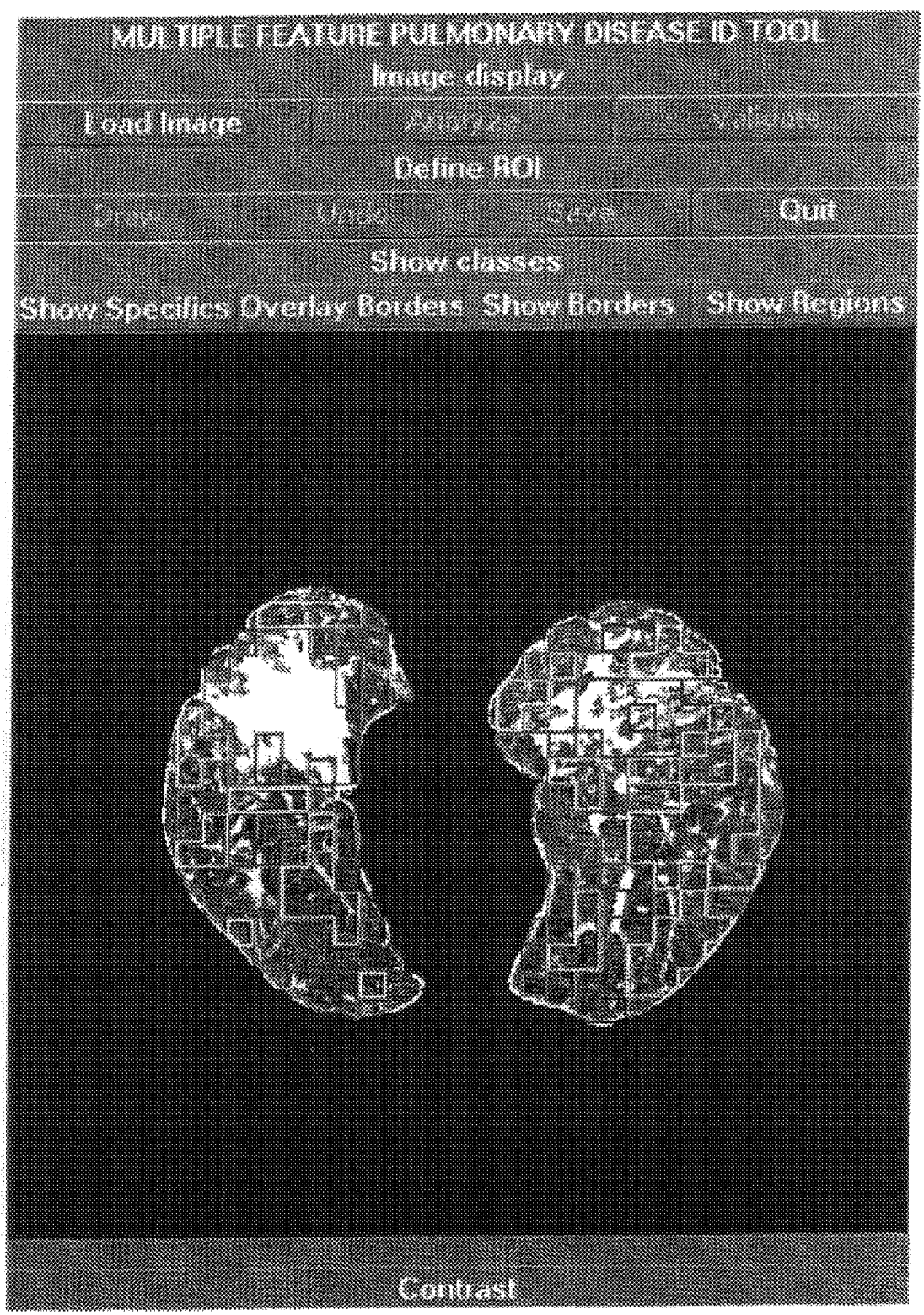

The user also has the option to display various color-coded output images via a series of "Show Classes" options, defined by the four graphic buttons 1440–1455 that appear on the graphic user interface section 1400. The SHOW REGIONS button 1455 permits the user to display, as shown in FIG. 17, a computer-evaluated image 1710 with color-coded regions indicative of their respective various tissue pathology classes. The SHOW BORDERS button 1450 permits the user to display a computer-evaluated image 1810 with color-coded borders indicative of the normal and diseased regions as depicted in FIG. 18. And, as shown in FIG. 19, the user has the option to overlay the color-coded borders on the original CT image slice 1475 by selection of the OVERLAY BORDERS button 1445.

Figure 20:
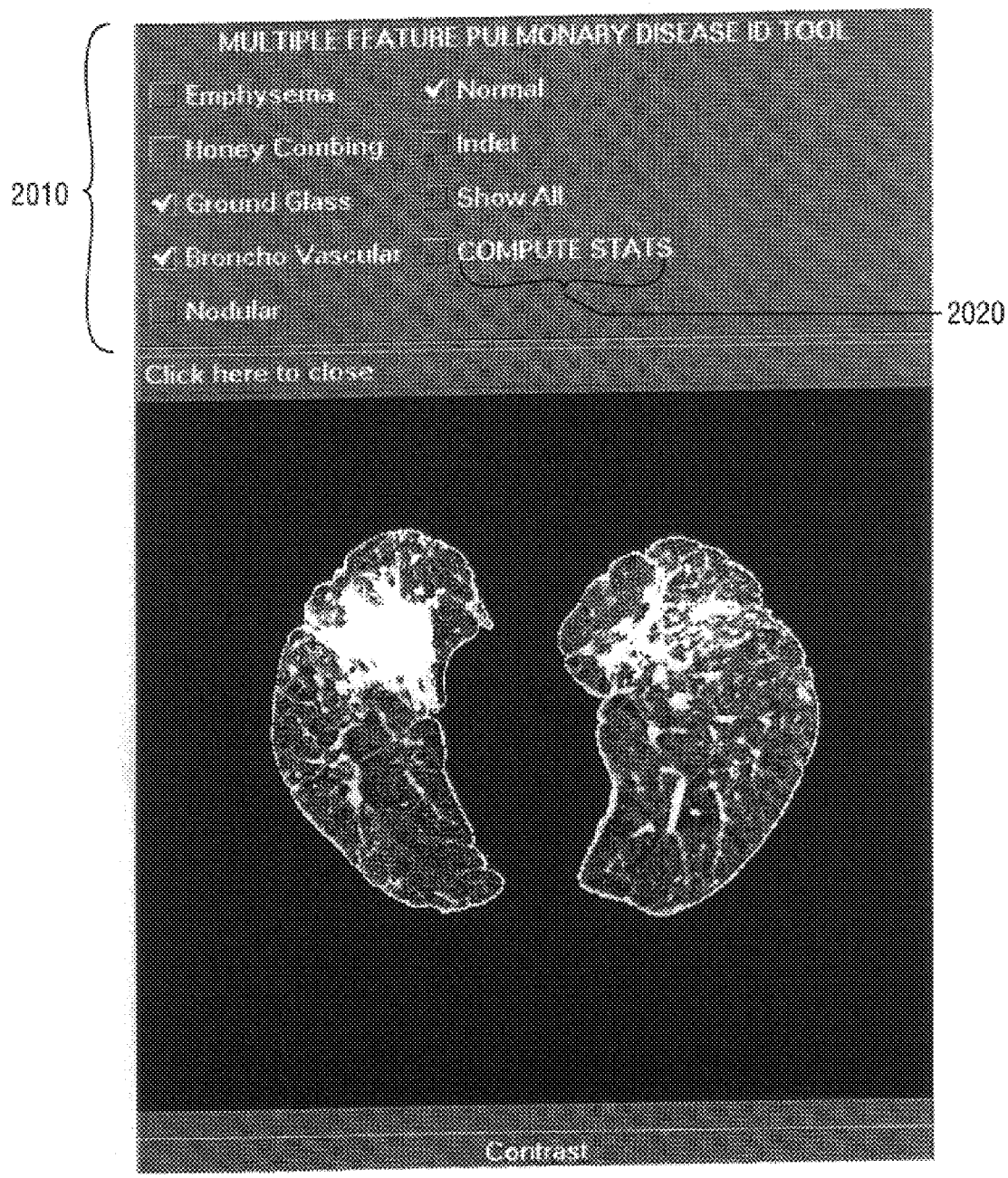
Figure 21:
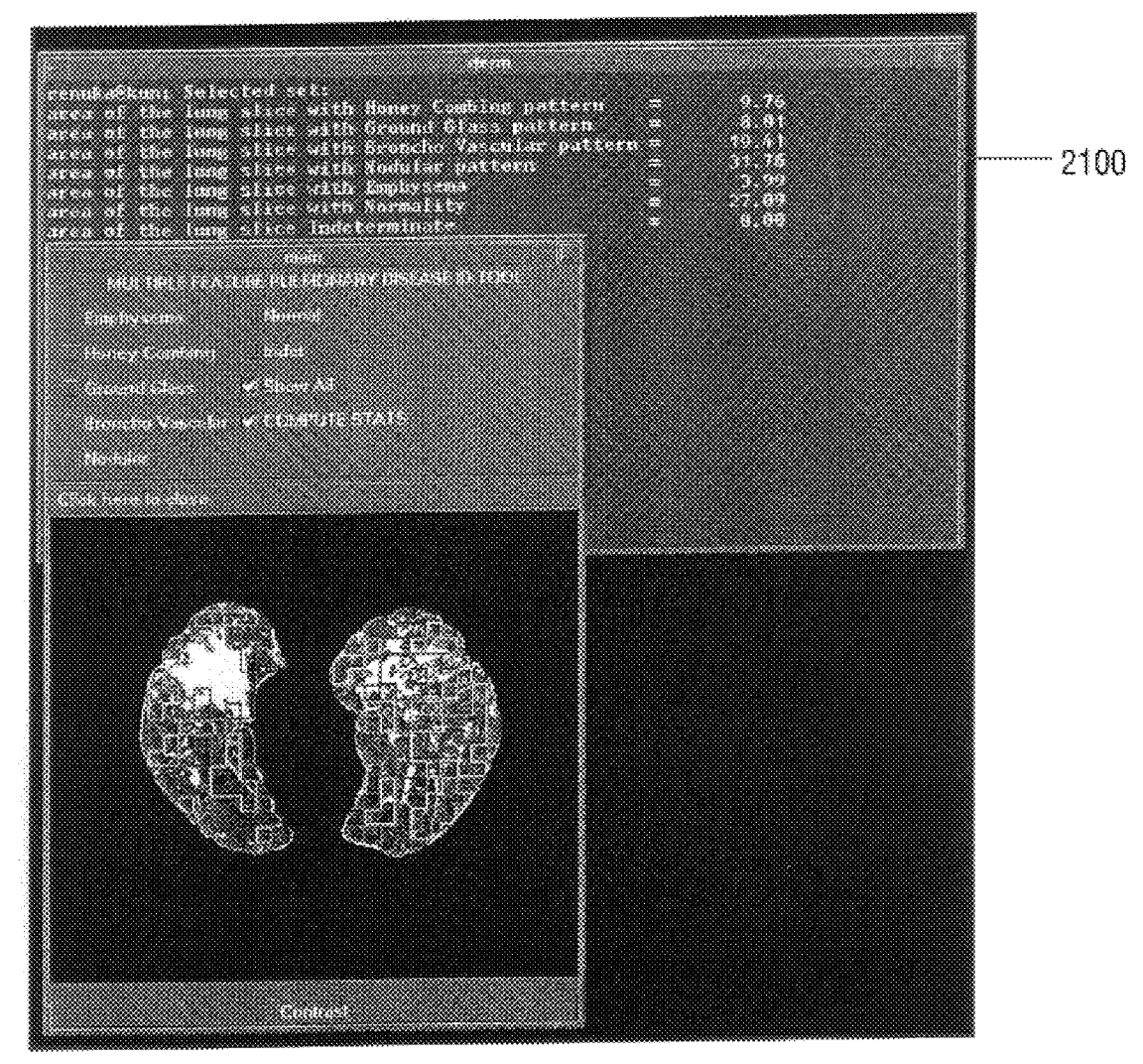

The SHOW SPECIFICS button 1440 permits the user to view the tissue pathology classes separately or to view a subset of all the tissue pathology classes simultaneously. Subsequent to selection of the SHOW SPECIFICS button 1440, as shown in FIG. 20, a window 2010 appears. The user is then able to select specific tissue pathology classes such that the image 1475 indicates the regions of the slice possessing the desired tissue pathology classes. The user is further given a COMPUTE STATS option 2020, which displays the area 2100 (in a quantitative measurement) of the lung possessing the particular tissue pathology class as shown in FIG. 21.

Figure 22:
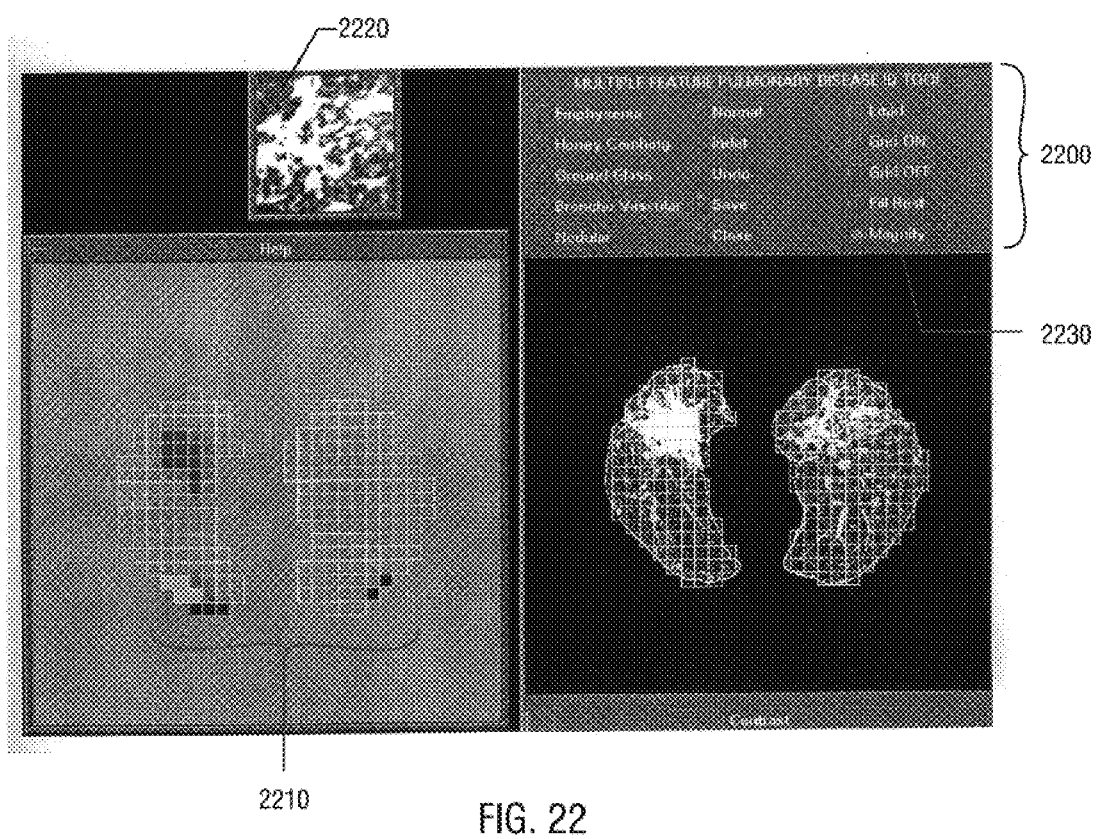

The VALIDATE button 1415, on the graphic user interface 1400, enables "observer validation" of the CT slice. This option permits the user to classify the 15×15 blocks (centered in their respective 31×31 ROIs) independently of system 1300. When the VALIDATE option 1415 is selected, the display 1350 shows FIG. 22 as its output. The user first makes a selection of one of the plurality of tissue pathology class patterns in window 2200. Subsequently, the user "clicks" on the boxes of the image (in window 2210) that he or she thinks represents the appropriate tissue pathology class. The user further can choose a MAGNIFY option 2230 and click on one of the boxes in window 2210 to magnify the image within the box. The magnified box then appears at the center of a "magnifying" window 2220 in order to provide the user with a more detailed view of the textural differences within the box for classification purposes. Essentially, this option enables the user to manually classify regions of the image based upon his or her interpretation and then make comparisons with the system's quantitative assessment.

Those skilled in the art will now see that certain modifications can be made to the apparatus and methods herein disclosed with respect to the illustrated embodiments, without departing from the spirit of the present invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

For example, although the present invention has been described as an application performed by a computer system, it is conceivable that the present invention be developed as a system solely dedicated for diagnostic medical image analysis or could also be developed as an integral part of the diagnostic medical image equipment (e.g., CT scanner) itself. Furthermore, although the present invention herein described is directed to the analysis of computed tomography (CT) images, the present invention could also be adapted for analysis of other types of diagnostic medical images, such as (but not limited to) X-rays, ultrasound, magnetic resonance imaging (MRI), etc. In addition, although the present invention is directed to the analysis of pulmonary tissue pathology, the invention could be adapted for analysis of other tissue pathology of the body and not solely limited to the lung region. Furthermore, although the first and second order texture measures and fractal measures have been described as being performed on a two-dimensional image slice, it will be appreciated that such analysis could be performed three-dimensionally by analyzing a volume of the lung (through a set of CT slices simultaneously) without departing from the spirit and scope of the present invention.

What is claimed is:

1. A method for automated analysis of textural differences present on a diagnostic medical image, said image comprising a plurality of pixels, with each pixel having a gray level assigned thereto, said method comprising:

defining a region of interest (ROI) on said image;

forming pixel regions within said image, wherein said pixels that are located adjacent one another are assigned a common gray level providing that said adjacent pixels' gray levels differ by an insignificant amount;

performing at least one first order texture measure within said ROI to describe a frequency of occurrence of all gray levels assigned to pixels of said ROI;

determining the number of times a particular gray level "i" of a pixel "x" within said ROI and a particular gray level "j" of another pixel within said ROI are separated by a distance of approximately two pixels in a direction "φ" relative to pixel "x";

performing at least one second order texture measure within said ROI to describe spatial interdependencies between the pixels of said ROI; and classifying said ROI as belonging to a tissue pathology class based upon said first and second order texture measures obtained.

2. The method of claim 1, wherein prior to defining an ROI, said method further comprises:

removing structures within said image by assigning pixels that form said structures a particular gray level.

3. The method of claim 1, wherein prior to defining an ROI, said method further comprises:

performing said second order texture measure within only said ROI.

4. The method of claim 3, wherein said commonly assigned gray level is the average of all said adjacent pixels' gray levels that differ in value by an insignificant amount.

5. The method of claim 3, wherein said adjacent pixels' gray levels differing by an insignificant amount is a difference in gray level of 20 or less.

6. The method of claim 3, wherein prior to forming pixel regions within said image, said method further comprises:

converting said image from an 11-bit format to an 8-bit format.

7. The method of claim 1, wherein prior to said classifying, said method further comprises:

centering a pixel block about each pixel of said ROI;

determining the average of absolute gray level intensity differences of each possible pixel-pair separated by a distance "d" within said pixel block; and assigning the pixel, about which said pixel block is centered, a stochastic fractal value based upon said average absolute gray level intensity differences obtained.

8. The method of claim 7, wherein said method further comprises:

assigning said pixels of said ROI only one of two binary values dependent upon their respective gray levels;

mapping said image onto a grid of super-pixels of increasing size "e";

determining the number of said super-pixels that are one binary value within said ROI; and determining a geometric fractal value of said ROI based upon said determined number of super-pixels that are said one binary value.

9. The method of claim 1, wherein prior to said classifying, said method further comprises:

eliminating said first order and second order texture measures which are redundant or fail to properly distinguish a particular tissue pathology class.

10. The method of claim 1, wherein prior to said classifying, said method further comprises:

providing known samples of particular tissue pathology classes;

performing first order and second order texture measures from said samples; and storing said first order and second order texture measures obtained from said samples in association with said particular tissue pathology classes.

11. The method of claim 10, wherein said method further comprises:

determining the probability that said ROI belongs to a particular tissue pathology class based upon said stored texture measures and said first and second order texture measures performed on said ROI; and classifying said ROI to the particular tissue pathology class for which said probability is the highest.

12. The method of claim 1, wherein said performing one or more second order texture measures further comprises:

determining gray level run-lengths that exist within said ROI by inspecting the existence of consecutive, collinear pixels that possess the same gray level in said ROI.

13. The method of claim 1, wherein said performing one or more second order texture measures further comprises:

determining the number of times a particular gray level and another particular gray level occur at a separation distance "d" within said ROI.

14. The method of claim 1, wherein said method further comprises:

assigning a color code to said ROI that is indicative of said particular tissue pathology class assigned to said ROI.

15. The method of claim 1, wherein said diagnostic medical image is a computed tomography (CT) image.

16. A method for automated analysis of a diagnostic medical image, said image comprising a plurality of pixels, with each pixel having a particular gray level assigned thereto, said method comprising:

defining a region of interest (ROI) on said image;

forming a co-occurrence matrix within said ROI, said forming including:

selecting a pixel "x" within said ROI;

determining the gray level "i" of pixel "x"; and determining a gray level "j" of a pixel residing at a distance "d" in a direction "φ" relative to pixel "x," wherein distance "d" is approximately two pixels in length;

forming pixel regions within said image by assigning a common gray level to a group of pixels which possess substantially similar gray levels;

obtaining measures from said image which describe relationships between said pixels, said obtaining including obtaining at least one co-occurrence matrix measure within said ROI to describe spatial interdependencies between the pixels of said ROI; and classifying areas of said image to a particular tissue pathology class based upon said texture measures obtained.

17. An apparatus, comprising:

an image input adapted to receive a diagnostic medical image, said image comprising a plurality of pixels, with each pixel having a particular gray level assigned thereto; and a processor adapted to define a region of interest (ROI) on said image and to form a co-occurrence matrix within said ROI by at least:

selecting a pixel "x" within said ROI;
determining the determining the gray level "i" of pixel "x"; and
determining a gray level "j" of a pixel residing at a distance "d" in a direction "φ" relative to pixel "x," wherein distance "d" is approximately two pixels in length;

said processor further adapted to perform texture measures on a group of pixels within said image, said texture measures providing information on an occurence frequency of gray levels assigned to said group of pixels and spatial interdependencies between particular pixels of said group of pixels, said texture measures including at least one co-occurrence matrix measure within said ROI to describe spatial interdependencies between the pixels of said ROI, said processor being adapted to classify said group of pixels to a tissue pathology class based upon said texture measures obtained, said processor being further adapted to form pixel regions within said image, wherein said pixels that are located adjacent one another are assigned a common gray level providing that said adjacent pixels' gray levels differ by an insignificant amount.

18. The apparatus of claim 17 further comprising:
a display for displaying a graphical user interface and said received image.

19. The apparatus of claim 18 further comprising:
a user input for use in conjunction with said graphical user interface, wherein a user of said apparatus is able to select a plurality of options of said apparatus by use of said user input and said graphical user interface.

20. The apparatus of claim 19, wherein said user input is a computer mouse.

21. The apparatus of claim 17, wherein said processor is further adapted to remove structures within said image by assigning pixels that form said structures a particular gray level.

22. The apparatus of claim 17, wherein said commonly assigned gray level is the average of all said adjacent pixels' gray levels that differ in value by an insignificant amount.

23. The apparatus of claim 17, wherein said adjacent pixels' gray levels differing by an insignificant amount is a difference in gray level of 20 or less.

24. The apparatus of claim 17, wherein said processor is further adapted to convert said received image from an 11-bit format to an 8-bit format.

25. The apparatus of claim 17, wherein said processor is further adapted to center a pixel block about each pixel of said group of pixels; determine the average of absolute gray level intensity differences of each possible pixel-pair separated by a distance "d" within said pixel block; and assign the pixel, about which said pixel block is centered, a stochastic fractal value based upon said average gray level intensity differences obtained.

26. The apparatus of claim 25, wherein said processor is further adapted to assign said pixels of said group of pixels only one of two binary values dependent upon their respective gray levels; map said image onto a grid of super-pixels of increasing size "e"; determine the number of said super-pixels that are one binary value within said group of pixels; and determine a geometric fractal value of said group of pixels based upon said determined number of super-pixels that are said one binary value.

27. The apparatus of claim 17, wherein said processor is further adapted to eliminate said texture measures which are redundant or fail to properly distinguish a particular tissue pathology class.

28. The apparatus of claim 17, wherein said image input is further adapted to receive samples of images that are known to possess a particular tissue pathology class; said processor is further adapted to determine texture measures from said received samples of images; and said apparatus further comprises:
storage for storing said texture measures obtained from said samples in association with said particular tissue pathology class.

29. The apparatus of claim 28, wherein said processor is further adapted to determine the probability that said group of pixels belongs to a particular tissue pathology class based upon said stored texture measures in said storage and said texture measures performed on said group of pixels; and said processor is further adapted to classify said group of pixels to the particular tissue pathology class for which said probability is the highest.

30. The apparatus of claim 17, wherein at least one of said texture measures is determined from gray level run-lengths that exist within said group of pixels by inspecting the existence of consecutive, collinear pixels that possess the same gray level.

31. The apparatus of claim 17, wherein at least one of said texture measures is determined from the number of times a particular gray level and another particular gray level, within said group of pixels, occur at a separation distance "d".

32. The apparatus of claim 18, wherein said processor is further adapted to assign a color code to said group of pixels that is indicative of said tissue pathology class classified to said group of pixels and said display means displays said color code on said image at the location of said group of pixels.

33. The apparatus of claim 17, wherein said texture measures comprise at least one first order texture measure to describe a frequency of occurrence of all gray levels assigned to pixels of said ROI and at least one second order texture measure to obtain spatial interdependencies between the pixels of said ROI.

34. The apparatus of claim 17, wherein said diagnostic medical image is a computed tomography (CT) image.

35. The method of claim 16, wherein said forming a co-occurrence matrix within said ROI further includes:
for a direction of either 0, 45, 90, 135, 180, 225, 270 or 315 degrees relative to said pixel "x", determining a gray level "j" of a pixel residing at a distance of approximately two pixels in length from said pixel "x".

36. The method of claim 16, wherein said forming a co-occurrence matrix within said ROI further includes:
for directions of 0, 45, 90, 135, 180, 225, 270 and 315 degrees relative to said pixel "x", determining a gray level "j" of a pixel residing at a distance of approximately two pixels in length from said pixel "x".

37. A method for automated analysis of textural differences present on a diagnostic medical image of the pulmonary region, said image comprising a plurality of pixels, with each pixel having a gray level assigned thereto, said method comprising:
defining a region of interest (ROI) on said image;
forming pixel regions within said image by assigning a common gray level to a group of pixels which possess substantially similar gray levels;

performing at least one first order texture measure within said ROI to describe a frequency of occurrence of all gray levels assigned to pixels of said ROI;

determining the number of times a particular gray level "i" of a pixel "x" within said ROI and a particular gray level "j" of another pixel within said ROI are separated by a distance of approximately two pixels in a direction "$\phi$" relative to pixel "x";

performing at least one second order texture measure within said ROI to describe spatial interdependencies between the pixels of said ROI;

centering a pixel block about each pixel of said ROI;

determining the average of absolute gray level intensity differences of each possible pixel-pair separated by a distance "d" within said pixel block;

assigning the pixel, about which said pixel block is centered, a stochastic fractal value based upon said average absolute gray level intensity differences obtained; and classifying said ROI as belonging to a tissue pathology class based upon said first and second order texture measures and said stochastic fractal value obtained.

* * * * *

UNITED STATES PATENT AND TRADEMARK OFFICE
CERTIFICATE OF CORRECTION

PATENT NO.    : 6,466,687 B1
DATED         : October 15, 2002
INVENTOR(S)   : Uppaluri et al.

It is certified that error appears in the above-identified patent and that said Letters Patent is hereby corrected as shown below:

Column 25,
Line 2, please delete "determining the determining the" and insert -- determining the -- therefor.

Signed and Sealed this

Twenty-fifth Day of February, 2003

JAMES E. ROGAN
*Director of the United States Patent and Trademark Office*